United States Patent
Basler et al.

(10) Patent No.: US 9,324,250 B2
(45) Date of Patent: *Apr. 26, 2016

(54) HIGH DYNAMIC RANGE DISPLAYS COMPRISING MEMS/IMOD COMPONENTS

(75) Inventors: Brad Basler, San Mateo, CA (US); Gopal Erinjippurath, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 660 days.

This patent is subject to a terminal disclaimer.

(21) Appl. No.: 13/547,770

(22) Filed: Jul. 12, 2012

(65) Prior Publication Data

US 2013/0063496 A1   Mar. 14, 2013

Related U.S. Application Data

(63) Continuation-in-part of application No. 13/228,807, filed on Sep. 9, 2011.

(51) Int. Cl.
*G09G 3/36* (2006.01)
*G09G 3/00* (2006.01)
(Continued)

(52) U.S. Cl.
CPC .............. *G09G 3/003* (2013.01); *G09G 3/3413* (2013.01); *G09G 3/3466* (2013.01);
(Continued)

(58) Field of Classification Search
CPC ................ G09G 2300/023; G09G 2310/0235; G09G 2320/0242; G09G 2320/0247; G09G 2320/0646; G09G 2360/16; G09G 3/003; G09G 3/3413; G09G 3/3466; G09G 3/3611; H04N 13/0404; H04N 13/0431; H04N 13/0438; H04N 13/0497; H04N 13/0409; H04N 13/0422; H04N 13/00; H04N 13/04; G02B 27/2214

USPC ........................................................... 348/51
See application file for complete search history.

(56) References Cited

U.S. PATENT DOCUMENTS 5,619,256 A    4/1997  Haskell
5,777,588 A *  7/1998  Woodgate et al. ................ 345/6
(Continued)

FOREIGN PATENT DOCUMENTS

CN    101019067    8/2007
CN    101119459    2/2008
(Continued)

OTHER PUBLICATIONS

Chen et al., Wide Color Gamut Displays Are here. What's next? 2013.*
(Continued)

*Primary Examiner* — Shan Elahi

(57) ABSTRACT

Several embodiments of display systems are disclosed that comprise a backlight source, a first modulator, a second modulator and a controller. The backlight source may further comprise an edge-lit backlighting source that may be controlled to affect a field-sequential illumination for the dual or multiple modulator display system. In another embodiment, the display system may comprise two or more color primary emitters that each comprise a color gamut. When the color gamuts are driven in a field sequential pattern, the resulting overall gamut is substantially wider. Other display systems and methods are disclosed herein that affect a variety of 3D viewing embodiments. Systems, methods and techniques to increase the dynamic range, color gamut and bit precision of display systems comprising MEMS and/or IMODs are presented.

18 Claims, 20 Drawing Sheets

(51) Int. Cl.
    *G09G 3/34* (2006.01)
    *H04N 13/04* (2006.01)
(52) U.S. Cl.
    CPC ........ *G09G 3/3611* (2013.01); *H04N 13/0404* (2013.01); *H04N 13/0431* (2013.01); *H04N 13/0438* (2013.01); *G09G 2300/023* (2013.01); *G09G 2310/0235* (2013.01); *G09G 2320/0242* (2013.01); *G09G 2320/0247* (2013.01); *G09G 2320/0646* (2013.01); *G09G 2360/16* (2013.01)

(56) References Cited

U.S. PATENT DOCUMENTS

| | | | |
|---|---|---|---|
| 5,978,142 A | 11/1999 | Blackham | |
| 6,046,849 A * | 4/2000 | Moseley et al. | 359/465 |
| 6,437,915 B2 * | 8/2002 | Moseley et al. | 359/465 |
| 6,608,614 B1 | 8/2003 | Johnson | |
| 6,882,384 B1 * | 4/2005 | Sharp | 349/78 |
| 7,053,880 B2 | 5/2006 | Lim | |
| 7,106,505 B2 | 9/2006 | Whitehead | |
| 7,344,292 B2 | 3/2008 | Kim | |
| 7,400,439 B2 | 7/2008 | Holman | |
| 7,525,730 B2 * | 4/2009 | Floyd | 359/578 |
| 7,683,880 B2 | 3/2010 | Lim | |
| 7,751,285 B1 * | 7/2010 | Cain | 368/82 |
| 7,753,530 B2 | 7/2010 | Whitehead | |
| 7,777,945 B2 | 8/2010 | Seetzen et al. | |
| 7,800,822 B2 | 9/2010 | Seetzen et al. | |
| 7,815,358 B2 | 10/2010 | Inditsky | |
| 7,852,441 B2 | 12/2010 | Yano | |
| 7,872,659 B2 | 1/2011 | Seetzen | |
| 7,911,428 B2 * | 3/2011 | Gally et al. | 345/84 |
| 8,125,425 B2 | 2/2012 | Whitehead | |
| 8,159,428 B2 * | 4/2012 | Hagood et al. | 345/84 |
| 8,164,602 B2 | 4/2012 | Seetzen | |
| 8,199,401 B2 | 6/2012 | Ninan | |
| 8,279,138 B1 * | 10/2012 | Margulis | 345/1.1 |
| 2002/0006044 A1 * | 1/2002 | Harbers et al. | 362/555 |
| 2002/0054424 A1 * | 5/2002 | Miles | 359/291 |
| 2002/0101197 A1 * | 8/2002 | Lys et al. | 315/291 |
| 2003/0025995 A1 | 2/2003 | Redert | |
| 2005/0212738 A1 * | 9/2005 | Gally | 345/88 |
| 2006/0290253 A1 | 12/2006 | Yeo | |
| 2007/0091043 A1 * | 4/2007 | Rho et al. | 345/88 |
| 2007/0152945 A1 | 7/2007 | Park | |
| 2007/0279372 A1 | 12/2007 | Brown Elliott | |
| 2008/0002429 A1 | 1/2008 | Noba | |
| 2008/0088649 A1 | 4/2008 | Ikeno | |
| 2008/0130082 A1 * | 6/2008 | Kothari et al. | 359/238 |
| 2008/0186334 A1 | 8/2008 | Seetzen | |
| 2008/0247128 A1 * | 10/2008 | Khoo | 361/681 |
| 2008/0253445 A1 | 10/2008 | Hekstra | |
| 2008/0253455 A1 | 10/2008 | Van Zon et al. | |
| 2008/0266900 A1 | 10/2008 | Harbers | |
| 2009/0126777 A1 * | 5/2009 | Khazeni et al. | 136/246 |
| 2009/0174638 A1 | 7/2009 | Brown Elliott et al. | |
| 2009/0201320 A1 | 8/2009 | Damberg | |
| 2009/0207237 A1 | 8/2009 | Leveco | |
| 2009/0224678 A1 | 9/2009 | Wang | |
| 2009/0225234 A1 * | 9/2009 | Ward et al. | 348/744 |
| 2009/0244386 A1 | 10/2009 | Norgaard | |
| 2009/0284459 A1 | 11/2009 | Wallener | |
| 2009/0322800 A1 | 12/2009 | Atkins | |
| 2010/0007577 A1 * | 1/2010 | Ninan et al. | 345/1.3 |
| 2010/0079584 A1 | 4/2010 | Sung | |
| 2010/0079703 A1 | 4/2010 | Chung | |
| 2010/0079847 A1 * | 4/2010 | Patel et al. | 359/290 |
| 2010/0118045 A1 | 5/2010 | Brown Elliott et al. | |
| 2010/0118218 A1 | 5/2010 | Eichenlaub | |
| 2010/0214282 A1 | 8/2010 | Whitehead | |
| 2010/0283036 A1 * | 11/2010 | Coe-Sullivan et al. | 257/13 |
| 2011/0013423 A1 | 1/2011 | Selbrede | |
| 2011/0038043 A1 | 2/2011 | Lin | |
| 2011/0050559 A1 | 3/2011 | Seetzen | |
| 2011/0063330 A1 | 3/2011 | Bae | |
| 2011/0063333 A1 | 3/2011 | Chiou | |
| 2011/0149374 A1 * | 6/2011 | Lan et al. | 359/291 |
| 2011/0205494 A1 | 8/2011 | Richards | |
| 2011/0279749 A1 | 11/2011 | Erinjippurath | |
| 2011/0316764 A1 * | 12/2011 | Parry-Jones et al. | 345/60 |
| 2012/0062607 A1 | 3/2012 | Erinjippurath | |
| 2012/0236390 A1 * | 9/2012 | Wang et al. | 359/291 |
| 2012/0259392 A1 | 10/2012 | Feng | |

FOREIGN PATENT DOCUMENTS

| | | |
|---|---|---|
| CN | 101165767 | 4/2008 |
| CN | 101180889 | 5/2008 |
| CN | 101595416 | 12/2009 |
| CN | 101592416 | 5/2012 |
| EP | 2337014 | 6/2011 |
| JP | 2005301026 | 10/2005 |
| KR | 10-2008-0080614 | 9/2008 |
| KR | 10-2008-0090397 | 10/2008 |
| WO | 02076105 | 9/2002 |

OTHER PUBLICATIONS

Derlofske et al, Quantum Dot Enhancement of Color for LCD Systems, 2014.*

Mirasol-imod-tech-overview, Interferometric Modulator (IMOD) Technology Overview, White Paper, 2009.*

LRTB GFTG 6-lead in-line MULTILED Enhanced Optical Power LED (ThinFilm/ThinGaN) May 29, 2009, published by OSRAM Opto Semiconductors GmbH pp. 1-25.

Chen, et al., "A Field Sequential Color LCD Based on Color Fields Arrangement for Color Breakup and Flicker Reduction" Journal of Display Technology, vol. 5, No. 1, Jan. 2009, pp. 34-39.

Toor, Amar, "Nanosys Unveils Quantum Dot Enhancement Film for LCD's, promises all Kinds of Colors" Engadget, May 17, 2011.

PHYSORG, Samsung Develops Worlds' First Blue Phase Technology to Achieve 240 HZ Driving Speed for High Speed Video, May 4, 2008.

A window LCD achieved by color sequential methods, C.C. Tsai, et al., Chunghwa Picture Tubes, LLC, SID Conference 2011, Los Angeles.

Fujikake, et al., "Flexible Color Moving-Image Displays Using Ferroelectric Liquid Crystal with Polymer Dispersion" IEEE, Piscataway, NJ, 2007 Conference on Lasers and Electro Optics; conference date: Aug. 26-31, 2007.

Lin, et al., "Color Breakup Suppression by Local Primary Desaturation in Field-Sequential Color LCS's" Journal of Display Technology, vol. 7, No. 2, Feb. 2011, pp. 55-61.

Shieh, et al., "Advanced Methods for Field-Sequential-Color LCDs with Associated Power Reduction Advantages", Information Display, vol. 26, No. 09, Sep. 2010 LCD Issue.

Lin, et al., "Color Filter-Less LCDs in Achieving High Contrast and Low Power Consumption by Stencil Field-Sequential-Color Method" IEEE Journal of Display Technology, vol. 6, No. 3, Mar. 2010, pp. 98-106.

Huang, et al., "Energy-Recycling (ER) Technique for a Direct-Lit Intelligent Power Management Backlight Unit (BLU)" IEEE Transactions on Power Electronics, vol. 25, No. 10, Oct. 2010, pp. 2588-2598.

Cheng, et al., "Color Breakup Suppression in Field-Sequential Five-Primary-Color LCD's" Journal of Display Technology, vol. 6, No. 6, Jun. 2010, pp. 229-234.

Pei-Li Sun "RGBW Color Separation for Field Sequential Color LCDs" Proceedings of the SPIE—The International Society for Optical Engineering, vol. 6807, published on Jan. 27, 2008.

Chiou, et al., "Low-Power Consumption Color-Filterless 15.4 inch TN-TFT Notebook" 15th International Display Workshops, Proceedings, vol. 1, Niigata, JP, Dec. 3-5, 2008.

(56) References Cited

OTHER PUBLICATIONS

Seki, et al., "Advances in Field Sequential Color OCB LCD with Backlight Scanning Technology" 13th International Display workshops, Institute of Image Information and Television Engineers, ITE, publication date Dec. 1, 2006.

Chen, et al., "Mixed Color Sequential Technique for Reducing Color Breakup and Motion Blur Effects" Journal of Display Technology, vol. 3, No. 4, Dec. 2007, pp. 377-385.

Chen, et al., "Mixed Color Sequential Technique for High Contrast LCD with Optimum Power Consumption" SID Symposium Digest of Technical Papers, May 2007, vol. 38, issue 1 pp. 134-137.

Zhang, et al., "A Field-Sequential-Color Display with a Local-Primary-Desaturation Backlight Scheme" Journal of the Society for Information Display—Mar. 2011—vol. 19, Issue 3, pp. 258-264.

Sun, Pei-Li, "High Dynamic Range LCD Using Extended Stencil-FSC Method" Proceedings of SPIE—The International Society for Optical Engineering, vol. 7241, published in Mar. 2009.

* cited by examiner

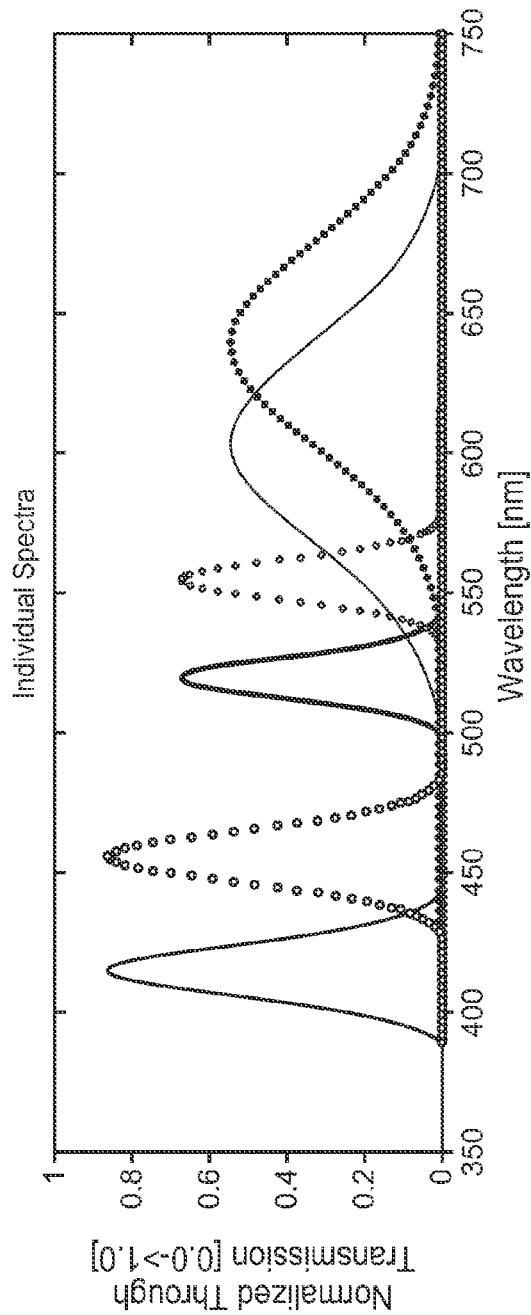
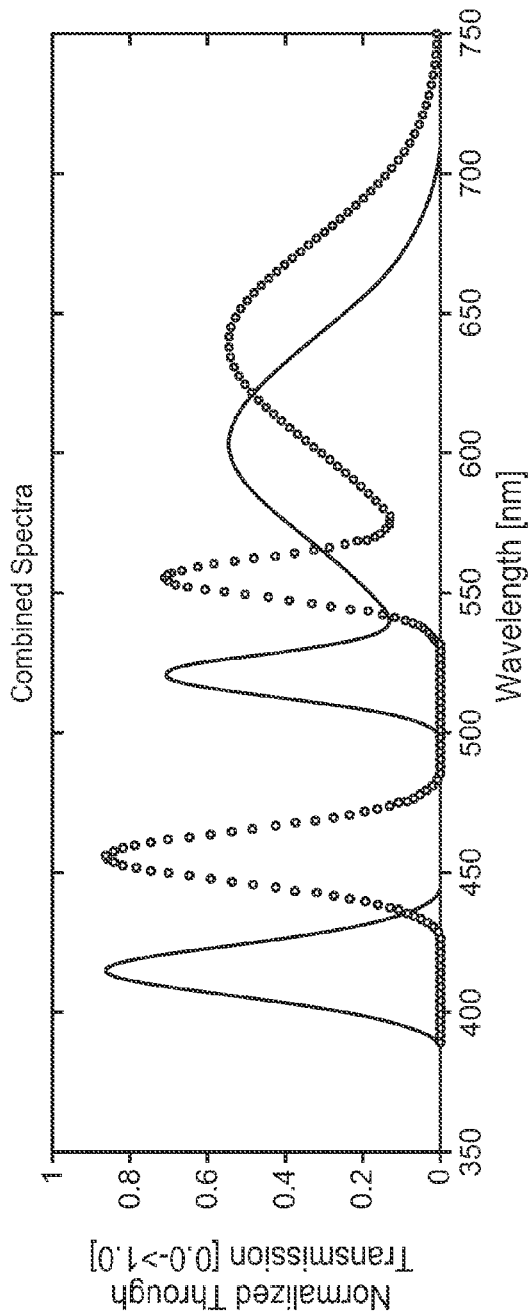
FIG. 27A
FIG. 27B

HIGH DYNAMIC RANGE DISPLAYS COMPRISING MEMS/IMOD COMPONENTS

CROSS-REFERENCE TO RELATED APPLICATIONS

This patent application is a Continuation-in-Part (CIP) application, and claims the benefit of, a co-pending application with a Ser. No. 13/228,807 filed by a common inventor of this application on Sep. 9, 2011. The disclosure made in the application Ser. No. 13/228,807 is hereby incorporated by reference in its entirety.

TECHNICAL FIELD

The present invention relates to displays systems and, more particularly, to novel high dynamic display systems employing Micro-Electro-Mechanical systems ("MEMS") and/or interferometric modulator ("IMOD").

BACKGROUND

In the field of displays comprising MEMS and/or IMOD technology, the following are known in the art: (1) United States Patent Application Number 20110261046 to Govil et al., published Oct. 27, 2011 and entitled "SYSTEM AND METHOD FOR PIXEL-LEVEL VOLTAGE BOOSTING"; (2) United States Patent Application Number 20120154881 to Gruhlke et al., published Jun. 21, 2012 and entitled "HOLOGRAPHIC BRIGHTNESS ENHANCEMENT FILM"; (3) United States Patent Application Number 20120120682 to Sasagawa et al., published May 17, 2012 and entitled "ILLUMINATION DEVICE WITH LIGHT GUIDE COATING"; (4) United States Patent Application Number 20120116709 to Martin et al., published May 10, 2012 and entitled "DISPLAY-INTEGRATED OPTICAL ACCELEROMETER"; (5) United States Patent Application Number 20120075313 to Gousev et al., published Mar. 29, 2012 and entitled "INTERFEROMETRIC OPTICAL DISPLAY SYSTEM WITH BROADBAND CHARACTERISTICS"; (6) United States Patent Application Number 20110037907 to Miles, published Feb. 17, 2011 and entitled "CONTROLLER AND DRIVER FEATURES FOR BI-STABLE DISPLAY"; (7) United States Patent Application Number 20090225395 (the '395 application) to Ganti et al., published Sep. 10, 2009 and entitled "INTERFEROMETRIC MODULATOR IN TRANSMISSION MODE"; (8) United States Patent Application Number 20110075241 (the '241 application) to Mienko et al., published Mar. 31, 2011 and entitled "INTERFEROMETRIC DISPLAY WITH INTERFEROMETRIC REFLECTOR"; (9) United States Patent Application Number 20110286072 to Liu et al., published Nov. 24, 2011 and entitled "METHOD AND STRUCTURE CAPABLE OF CHANGING COLOR SATURATION"; (10) United States Patent Application Number 20120050299 to Mignard et al., published Mar. 1, 2012 and entitled "DIELECTRIC ENHANCED MIRROR FOR IMOD DISPLAY"; (11) United States Patent Application Number 20070285761 to Zhong et al., published Dec. 13, 2007 and entitled "MEMS DEVICE WITH INTEGRATED OPTICAL ELEMENT"; (12) United States Patent Application Number 2011273377 to Merz et al., published Nov. 10, 2011 and entitled "BACKLIGHT FOR A DISPLAY"—all of which are incorporated by reference in their entirety.

In the field of high contrast, energy efficient, wide color gamut displays, it is known to create displays comprising a backlight of discrete independently controllable emitters (e.g. LEDs—both inorganic and organic) and a high resolution LCD panel. The combination of a low resolution backlight and a high resolution LCD panel (i.e. "dual modulator displays") is disclosed further in co-owned: (1) U.S. Pat. No. 7,753,530 entitled "HDR DISPLAYS AND CONTROL SYSTEMS THEREFOR"; (2) United States Patent Application Publication Number 2009322800 entitled "METHOD AND APPARATUS IN VARIOUS EMBODIMENTS FOR HDR IMPLEMENTATION IN DISPLAY DEVICES"; (3) United States Patent Application Publication Number 2009284459 entitled "ARRAY SCALING FOR HIGH DYNAMIC RANGE BACKLIGHT DISPLAYS AND OTHER DEVICES"; (4) United States Patent Application Publication Number 2008018985 entitled "HDR DISPLAYS HAVING LIGHT ESTIMATING CONTROLLERS"; (5) United States Patent Application Publication Number 20070268224 entitled "HDR DISPLAYS WITH DUAL MODULATORS HAVING DIFFERENT RESOLUTIONS"; (6) United States Patent Application Publication Number 20070268211 entitled "HDR DISPLAYS WITH INDIVIDUALLY-CONTROLLABLE COLOR BACKLIGHTS"; (7) United States Patent Application Publication Number 20100214282 entitled "APPARATUS FOR PROVIDING LIGHT SOURCE MODULATION IN DUAL MODULATOR DISPLAYS"; (8) United States Patent Application Publication Number 20090201320 entitled "TEMPORAL FILTERING OF VIDEO SIGNALS"; (9) United States Patent Application Publication Number 20070268695 ("the '695 application") entitled "WIDE COLOR GAMUT DISPLAYS"; (10) United States Patent Application 20070285587 to Seetzen, published Dec. 13, 2007 and entitled "DRIVING DUAL MODULATION DISPLAY SYSTEMS USING KEY FRAMES"; (11) United States Patent Application 20080043303 to Whitehead et al., published Feb. 21, 2008 and entitled "HDR DISPLAYS WITH OVERLAPPING DUAL MODULATION"; (12) United States Patent Application 20080180465 to Whitehead et al., published Jul. 31, 2008 and entitled "APPARATUS AND METHODS FOR RAPID IMAGE RENDERING ON DUAL-MODULATOR DISPLAYS"; (13) United States Patent Application 20080180466 to Whitehead et al., published Jul. 31, 2008 and entitled "RAPID IMAGE RENDERING ON DUAL-MODULATOR DISPLAYS"; (14) United States Patent Application 20100277515 to Ward et al., published Nov. 4, 2010 and entitled "MITIGATION OF LCD FLARE"; (15) United States Patent Application 20100328537 to Davies et al., published Dec. 30, 2010 and entitled "SYSTEM AND METHOD FOR BACKLIGHT AND LCD ADJUSTMENT"; (16) United States Patent Application 20110032248 to Atkins, published Feb. 10, 2011 and entitled "RETENTION AND OTHER MECHANISMS OR PROCESSES FOR DISPLAY CALIBRATION"; (17) United States Patent Application 20110169881 to Wallener et al., published Jul. 14, 2011 and entitled "SYSTEM AND METHODS FOR APPLYING ADAPTIVE GAMMA IN IMAGE PROCESSING FOR HIGH BRIGHTNESS AND HIGH DYNAMIC RANGE DISPLAYS"; (18) United States Patent Application 20110193610 to Longhurst, published Aug. 11, 2011 and entitled "EFFICIENT COMPUTATION OF DRIVING SIGNALS FOR DEVICES WITH NON-LINEAR RESPONSE CURVES"; (19) United States Patent Application 20110227900 to Wallener, published Sep. 22, 2011 and entitled "CUSTOM PSFS USING CLUSTERED LIGHT SOURCES"; (20) United States Patent Application 20110273495 to Ward et al., published Nov. 10, 2011 and entitled "APPARATUS AND METHODS FOR COLOR DISPLAYS"; (21) United States Patent Application 20110279749 to Erinjippurath et al., published Nov. 17, 2011 and entitled "HIGH DYNAMIC RANGE DISPLAYS USING FILTERLESS LCD(S) FOR INCREASING CONTRAST AND RESOLUTION"; (22) United States Patent Application 20120062607 to Erinjippurath et al., published Mar. 15, 2012 and entitled "METHOD AND APPARATUS FOR EDGE LIT DISPLAYS"; (23) United States Patent Application 20120075360 to Messmer, published Mar. 29, 2012 and entitled "SYSTEMS AND METHODS FOR CONTROLLING DRIVE SIGNALS IN SPATIAL LIGHT MODULATOR DISPLAYS"; (24) United States Patent Application 20120092395 to Seetzen, published Apr. 19, 2012 and entitled "EDGE-LIT LOCAL DIMMING DISPLAYS, DISPLAY COMPONENTS AND RELATED METHODS"; (25) United States Patent Application 20120113167 to Margerm et al., published May 10, 2012 and entitled "REDUCED POWER DISPLAYS"; (26) United States Patent Application 20120113498 to Margerm et al., published May 10, 2012 and entitled "CONTROL OF ARRAY OF TWO-DIMENSIONAL IMAGING ELEMENTS IN LIGHT MODULATING DISPLAYS"; (27) United States Patent Application 20120133689 to Kwong, published May 31, 2012 and entitled "REFLECTORS WITH SPATIALLY VARYING REFLECTANCE/ABSORPTION GRADIENTS FOR COLOR AND LUMINANCE COMPENSATION"; (28) United States Patent Application 20120140446 to Seetzen et al., published Jun. 7, 2012 and entitled "OPTICAL MIXING AND SHAPING SYSTEM FOR DISPLAY BACKLIGHTS AND DISPLAYS INCORPORATING THE SAME"; (29) United States Patent Application 20120026405 to Atkins et al., published Feb. 2, 2012 and entitled "SYSTEM AND METHOD OF CREATING OR APPROVING MULTIPLE VIDEO STREAMS"; (30) United States Patent Application 20120063121 to Atkins, published Mar. 15, 2012 and entitled "MULTI-DIE LED PACKAGE AND BACKLIGHT UNIT USING THE SAME"; (31) United States Patent Application 20070268577 to Whitehead et al., published Nov. 22, 2007 and entitled "HDR DISPLAYS HAVING LOCATION SPECIFIC MODULATION"; (32) United States Patent Application 20100091045 to Heidrich et al., published Apr. 15, 2010 and entitled "MULTIPLE MODULATOR DISPLAYS AND RELATED METHOD"; (33) United States Patent Application Number 20120062607 to Erinjippurath et al., published Mar. 15, 2012 and entitled "METHOD AND APPARATUS FOR EDGE LIT DISPLAYS"—all of which are hereby incorporated by reference in their entirety.

Field sequential processing, as a technique for rendering color images, are well known in the art. For example, the following are examples of such field sequential display systems: (1) United States Patent Application Publication Number 20080253455 entitled "HIGH FRAME MOTION COMPENSATED COLOR SEQUENCING SYSTEM AND METHOD"; (2) United States Patent Application Publication Number 20070152945 entitled "LIQUID CRYSTAL DISPLAY OF FIELD SEQUENTIAL COLOR TYPE AND METHOD FOR DRIVING THE SAME"; (3) United States Patent Application Publication Number 20110063330 entitled "METHOD AND APPARATUS FOR REDUCING ERRONEOUS COLOR EFFECTS IN A FIELD SEQUENTIAL LIQUID CRYSTAL DISPLAY"; (4) United States Patent Application Publication Number 20110063333 entitled "COLOR SEQUENTIAL DISPLAY AND POWER SAVING METHOD THEREOF"—and are all hereby incorporated by reference in their entirety.

Typical field sequential display systems strive to present a sequence of differing, single primary color frames (that would typically combine to form a white color, if shown simultaneously) and have image data be analyzed to drive a modulator (such as an liquid crystal display, LCD)—at a suitably high frame rate—that the resulting sequence of images look pleasing to a viewer. It is known in the art that this type of image rendering sometimes has unpleasant viewing artifacts, such as color break-up, and some display systems try to reduce or minimize these effects by various techniques, including employing very high frame rates.

SUMMARY

Several embodiments of display systems and methods of their manufacture and use are herein disclosed.

In one embodiment, a display system comprises a backlight, a MEMS and/or IMOD backplane and a first modulator.

In yet another embodiment, a display system comprises a backlight source, a first modulator, a second modulator and a controller. The backlight source may further comprise an edge-lit backlighting source that may be controlled to affect a field-sequential illumination for the dual or multiple modulator display system.

In another embodiment, the display system may comprise two or more sets of color primary emitters such that each comprise a color gamut. When the color gamuts are driven in a field sequential pattern, the resulting overall gamut is substantially wider.

In yet another embodiment, the display system may comprise a lenticular lens sheet for affecting autostereoscopic 3D viewing. In other embodiments, the display system may comprise a matched polarizer to condition the light in the display system to operate with stand-alone polarized viewing glasses that affect a 3D viewing of image. In yet another embodiment, the display system may comprise a stand-alone active shutter glasses, such that the active shutter glasses are synchronized with the subpixels of the second modulator, in order to affect a 3D viewing of images.

In yet another embodiment, the display system may comprise: a backlight source providing light into an optical path; a MEMS/IMOD modulator which receives light from the backlight source and modulates the light on the optical path; a second modulator that receives light from the MEMS/IMOD modulator and transmits the light; a controller that receives input image data to be rendered upon said display system and sends signals to the MEMS/IMOD modulator and the second modulator.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 27A and 27B depict a plurality of spectra possible with MEMS/IMOD modulators.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

High dynamic range display systems are increasingly making their way into consumer display products. Several different display system configurations have attempted to affect high dynamic range. One such configuration is shown in FIG. 1 of the '695 application noted above. That configuration is a low resolution array of colored LED backlights that illuminates one side of a higher resolution LCD panel. The combination of separately modulated LED backlights, together with a separately modulated LCD panel, produces a display of very high dynamic range. However, the cost of such a display is driven in part by the cost of the LED backlights and the processing requirements needed to implement the dual modulated display. The processing requirements of such a system also depend upon the number of different LEDs whose light may transmit through any given subpixel of the LCD panel. As a rule of thumb, the more LEDs illuminating a LCD subpixel, the more processing is required to accurately and faithfully reproduce a rendered image thereon.

Edge-Lit Dual Panel Display System Embodiment

To produce a display that exhibits a similar high dynamic range; but without the cost of a backlight comprising an array of colored LEDs, various configurations are possible.

Figure 1A:
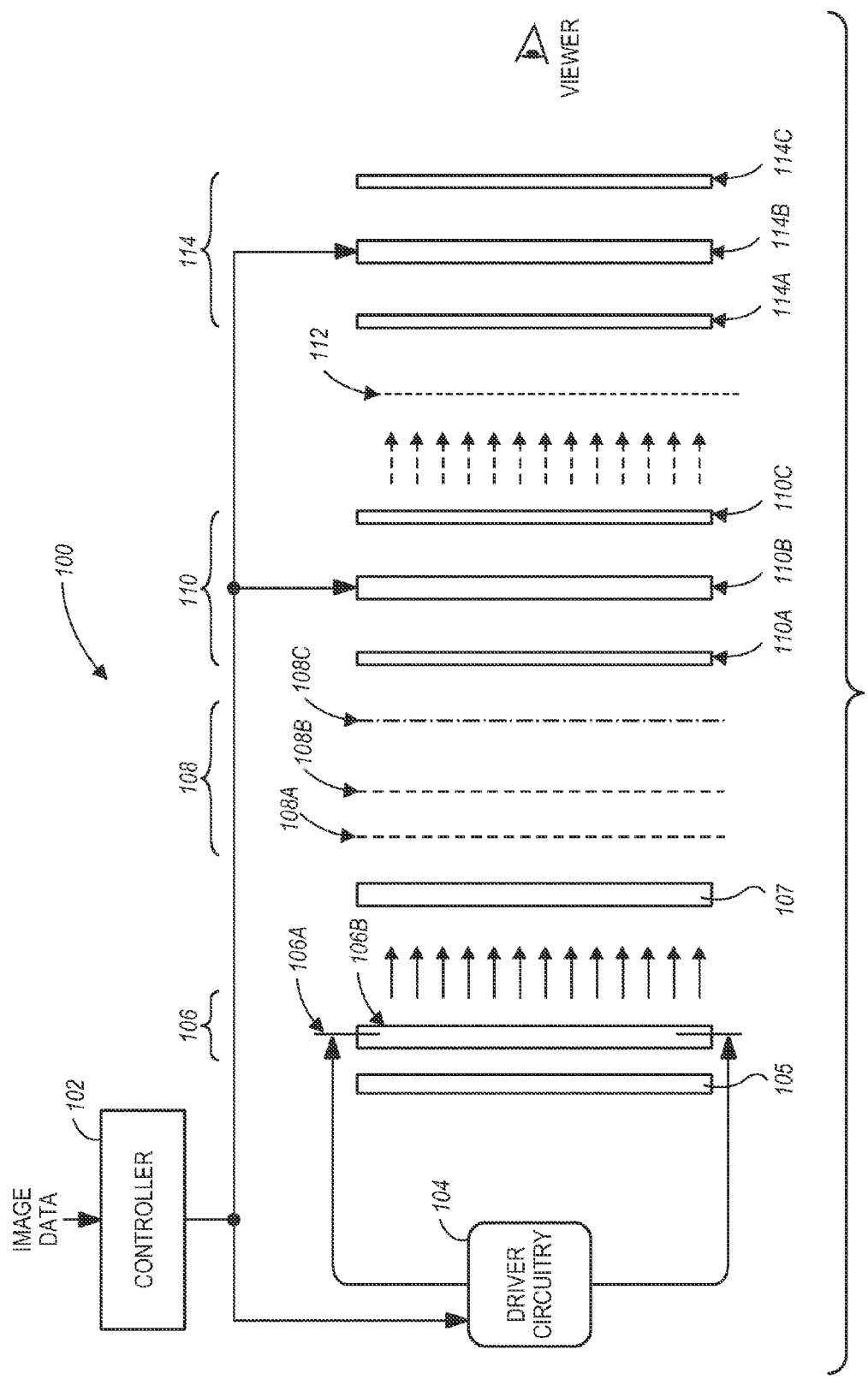
FIG. 1A shows an embodiment of a display made for high dynamic range comprising a field sequential backlight and two LCD modulators.

FIG. 1A is one such embodiment of a display system 100 that achieves high dynamic range without a separately modulated backlight. Broadly, display system 100 comprises a field sequential backlight 106 that emits light into an optical path (denoted by arrow emanating from backlight 106). Light in this optical path is modulated by a first modulator 110 and then by a second modulator 112. As will be discussed in greater detail below, this embodiment avoids the typical higher cost of previous high dynamic range display systems (having a backlight comprising an array of separately controllable LED emitters, as noted above) by employing a potentially smaller number of emitters forming an edge-lit display.

Other examples of such high dynamic range displays that comprises at least two LCD panels, the following commonly-owned applications: (1) U.S. patent application Ser. No. 12/780,740 filed on May 14, 2010 entitled "HIGH DYNAMIC RANGE DISPLAYS USING FILTERLESS LCD(s) FOR INCREASING CONTRAST AND RESOLUTION"; (2) Provisional U.S. Patent Application No. 61/479,966 filed on Apr. 28, 2011, entitled "DUAL PANEL DISPLAY WITH CROSS BEF COLLIMATOR AND POLARIZATION-PRESERVING DIFFUSER"; (3) Provisional U.S. Patent Application No. 61/450,802 filed on Mar. 9, 2011, entitled "HIGH CONTRAST GRAYSCALE AND COLOR DISPLAYS"—all of which are incorporated by reference in their entirety. These other displays also utilize dual modulator panels, together with a simpler backlighting scheme.

Continuing with the discussion of the embodiment of FIG. 1A, a more complete description of the display system follows—in order from inside components toward the viewable part of the display. Driving circuitry 104 drives emitters 106A (e.g. LED or other suitable emitters known in the art). Light from emitters 106A is dispersed by light waveguide 106B. Light that moves away from the optical path may be reflected back into the path by reflector 105 (e.g. ESR film, daylight film or the like).

Light collimation stack 108 may comprise bulk diffuser 107, BEF or prismatic film 108A, cross BEF or prismatic film 108B (possibly at 90 degrees relative to film 108A), DBEF film or reflective polarizer 108C. First modulator 110 may comprise polarizer 110A (possibly at +45 degrees), first modulator panel 110B (e.g. LCD panel or the like) and polarizer 110C (possibly at −45 degrees).

After first modulator 110, light may pass through diffuser 112 (which may be a polarization preserving or a holographic diffuser) before passing through second modulator 114. Second modulator 114 may comprise polarizer 114A (possibly at −45 degrees), second modulator panel 114B (e.g. LCD panel or the like) and polarizer 114C (possibly at +45 degrees). Light emanating from second modulator 114 is directly viewable as shown.

In one embodiment, first modulator panel 1108 and second modulator panel 114B may both be monochrome LCD panels in operation with colored LEDs aligned in an edge-lit manner. In another embodiment, one or both of the first modulator panel 1108 and second modulator panel 114B may comprise colored subpixels in operation with either colored LEDs or white LEDs aligned in an edge-lit manner. If both LCD panels are monochrome, then the throughput of light from the display system is increased, due to the absence of the color filter array (CFA) or avoidance of colored subpixel filters. Such brightness and energy efficiency increases may be further enhanced if the two monochrome LCDs are driven in tandem on a pixel-by-pixel basis in real time.

Additionally, very high contrast could be achieved with such a display system. The high contrast achieved by the optical multiplicative action of the two monochrome LCDs would allow for the accurate representation of high dynamic range motion imagery without light source modulation. However, for the accurate representation of wide color gamut (WCG), modulating the light source allows for the display of highly saturated colors when using light sources with a single or multiple dominant wavelengths.

In one embodiment, the light sources may comprise a set of LEDs. However, these LEDs may be substituted by other light emitters in commercial production like Organic LEDs (OLED), Quantum Dots (QD) or solid state lasers (SSL). It will also be appreciated that, in the various descriptions of embodiments, the monochrome LCDs may include active matrix LCDs, trans-reflective LCDs, window LCDs.

Field Sequential Color Processing with Edge-Lit Dual Panel Display

In reference to continued discussion of this embodiment, it will be assumed that the backlight comprises colored LEDs aligned in an edge-lit manner. In operation, image data is input into controller 102 which, after certain image processing steps (e.g. gamut mapping algorithms (GMA) or subpixel rendering algorithms (SPR), as are known in the art) may send image data and control signals to driver circuitry 104 and to first modulator panel 110B and second modulator panel 114B.

In one embodiment, edge-lit backlight 106 may comprise a set of colored emitters—e.g., red (R), green (G) and blue (B) LED emitters (and possibly other colored emitters as well, but for purposes of illustration, consider just R,G,B emitters for now)—wherein each R emitter is substantially one primary color in the red spectrum, each G emitter substantially one primary color in the green spectrum and each B emitter substantially one primary color in the blue spectrum (i.e. to within a certain degree of manufacturing tolerances). In such a display system, controller 102 may analyze image data for sending out control signals to first modulator panel 110B and second modulator panel 114B—to properly adjust the modulators (e.g. individual subpixels) to set the appropriate transmissiveness during each red, green and blue field to faithfully render the desired image.

In another embodiment, it is possible to employ an edge-lit backlight 106 comprising a set of colored emitters—e.g., red (R), green (G) and blue (B) LED emitters (and possibly other colored emitters as well, but for purposes of illustration, consider just R,G,B emitters for now). However, instead of using substantially one primary color per emitter (e.g. each R emitter is substantially one primary color in the red spectrum, etc.), backlight 106 may comprise, e.g., two or more primary colors in the red spectral region to produce the "red" color in the light path of the display system. It is also possible to utilize two or more primary colors in a subset or in each of the distinct spectral regions desired (e.g. two or more different "red" emitters, "green" emitters, "blue" emitters, "yellow" emitters, "cyan" emitters or the like as desired.) The proper selection of two or more "red" emitters may be accomplished by proper binning of red emitters and separating according to color output.

With such a display configuration, it is possible to group different emitters together, in various ways and combinations to affect a field sequential scheme having a wider color gamut, as compared to a more conventional field sequential system. Just for illustrative purposes, suppose the backlight comprised two "reds" (R1 and R2), two "greens" (G1 and G2) and two "blues" (B1 and B2). In that case, two white light spectrums may be produced by [R1, G1, B1] and [R2, G2, B2] sets of emitters. It will be appreciated that the selection of only R, G and B is not limiting, and that any other set of colored emitters (yellow, cyan, magenta or the like) may be used in a like fashion. In addition, variations of different sets of colored emitters may be used dynamically to create a white light—to affect a field sequential fashion. Controller 102 generates the control signals for the backlight array and the two monochrome LCDs. It may use scene analysis for determining the optimal order of driving the multi-primary light emitters based on the incoming input image frame in the video sequence for playback on the display.

Figure 1B:
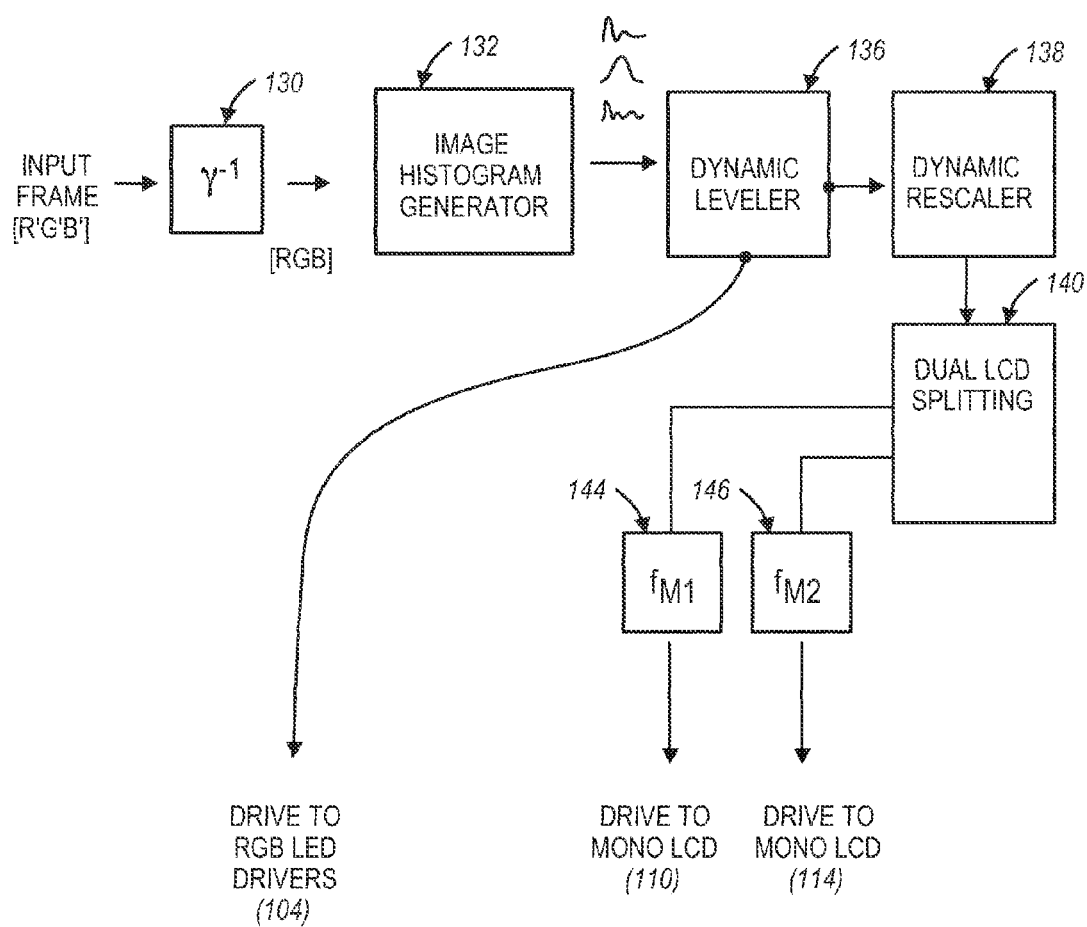
FIG. 1B shows one embodiment of an image processing pipeline for a display made in accordance with the embodiment of FIG. 1A.
Figure 1C:
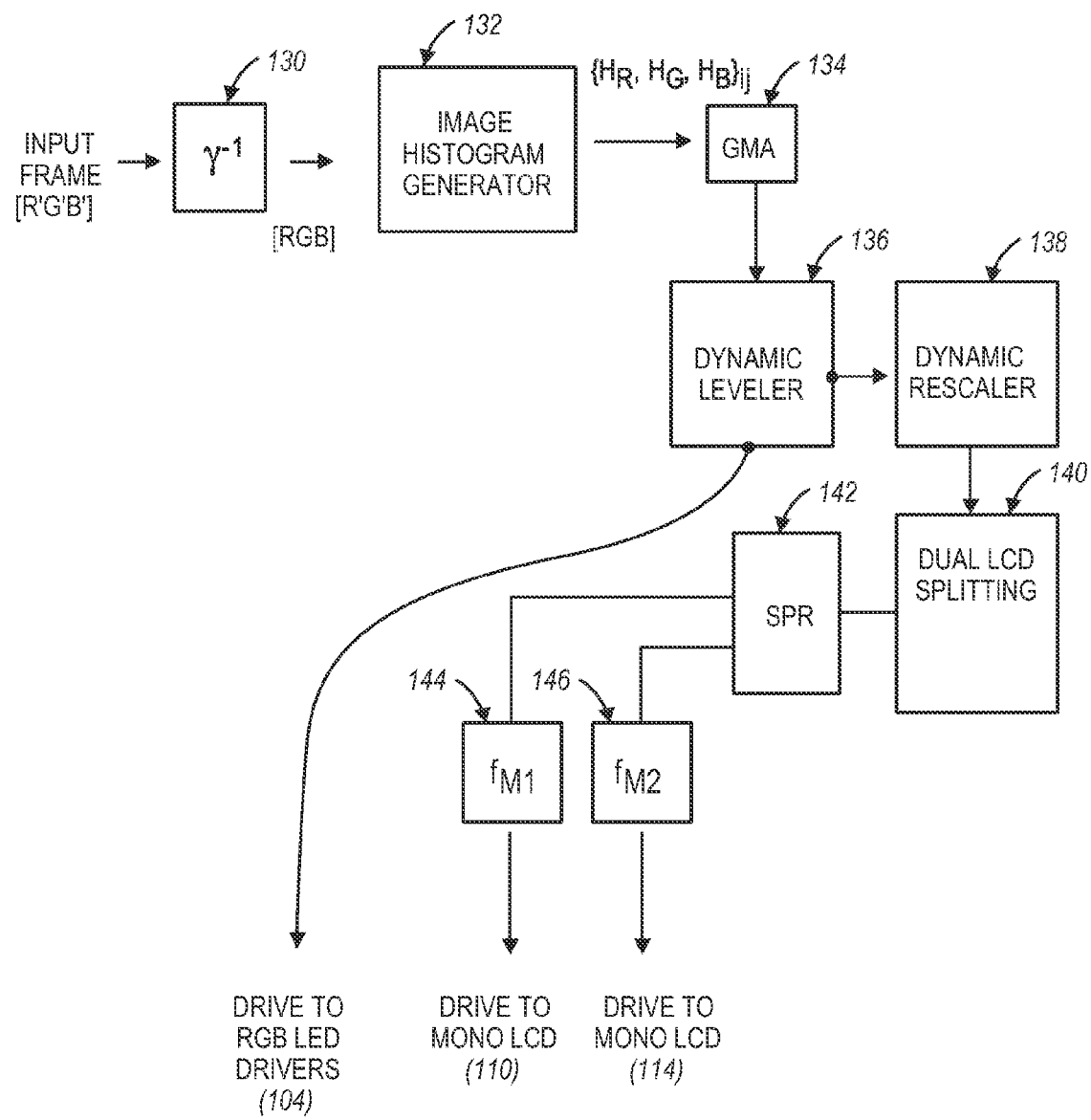
FIG. 1C shows yet another embodiment of an image processing pipeline for a display made in accordance with the embodiment of FIG. 1A.

FIG. 1B describes one embodiment of an image processing pipeline (or otherwise, a flow diagram) of the embodiment that may affected by controller 102 that generates the drive signals for the light emitter drivers 104 and the two monochrome LCDs 110 and 114. The incoming image frame from a video sequence intended to be viewed on the display embodiment may first go through an inverse gamma correction 130 function to represent the image pixel data in linear space. The corrected image may then be processed by the image histogram generator 132 to generate the histograms for the R, G and B color channels (or whatever color channels are provided by the display system). Based on the histograms, preliminary scene analysis is performed by dynamic leveler module 136 to determine the optimal signal of the different color channel LEDs for the particular frame. Based on this signal a distinct drive value is each of the RGB color light emitters. Based on the drive values for the individual channels and the peak drive value, the independent color channel images may then be rescaled in dynamic rescaler 138. The output of the rescaler is run through the dual LCD splitting 140 (that, e.g., may affect a square root function or the like) to generate linear drive values. However, the monochrome LCDs may have distinct LCD transmissivity functions that transform an input drive value to transmit light that is a percentage of the peak light transmission. By inverting these transmission functions, drivers 144 and 146 respectively generate signals for the two monochrome LCDs 110 and 114 respectively.

Yet another scheme for reducing the effect of color break-up is to employ "virtual primaries"—in which two or more different color emitters (e.g. green and blue) may be illuminated simultaneously to make a new "virtual" primary dynamically (e.g. cyan, in the present example). Such virtual primaries may be created according to image processing analysis of the image frame being currently rendered. Field sequential processing techniques using virtual primaries are known and discussed further in United States Patent Application Publication Number 20090174638 entitled "HIGH DYNAMIC CONTRAST DISPLAY SYSTEM HAVING MULTIPLE SEGMENTED BACKLIGHT" and United States Patent Application Publication Number 20080253445 entitled "COLOR CONVERSION UNIT FOR REDUCED FRINGING"—which are herein incorporated by reference in their entirety. In fact, it is possible to combine the various techniques of multiple primary sets, together with the techniques of virtual primaries to gain additional wide color gamut performance.

The concept of virtual primaries can be very effectively extended to the dual mono LCD based FSC system. As illustrated by the embodiment in FIG. 1C, a gamut mapping algorithm module, GMA 134, when used in conjunction with dynamic leveler 136 can be combined with a set of primaries to create virtual primaries with varying levels of de-saturation. In addition, if the backlight LEDs drivers are controlled by pulse width modulation (PWM), it may be possible to control the addressable color space for a specific region on the screen for a specific period of time in this fashion. Also, the combination of the dynamic leveler 136 for LED backlight drivers and for the choice of optimal virtual primaries, and the dynamic rescaler 138 for the optimal choice of LCD drive values can allow for reduced flicker which is predominant problem with FSC system as documented in literature. The inclusion of the sub-pixel rendering (SPR) algorithm module 142 can further enhance the viewing experience of the display constructed with this embodiment for providing better luminance and chrominance balance in the final rendered image from the display system, as is known in the art, by controlling the individual subpixel control signal values.

Figure 2:
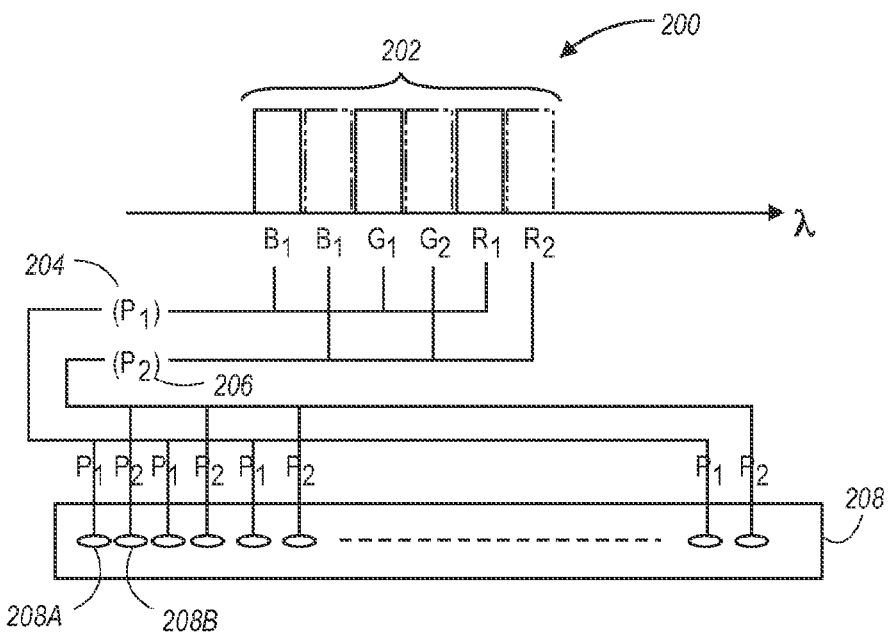
FIG. 2 shows one embodiment of a backlighting system and scheme for implementing edge-lighting for a display system.

FIG. 2 is one embodiment of a backlight scheme 200 for affecting multiple primary sets in such a display system. Supposing a display system comprises two white light spectrums (as noted above, [R1, G1, B1] and [R2, G2, B2]), then controller 102, after analyzing image data, may send out control signals to these two sets of primaries—labeled P1 (204) and P2 (206) respectively. Backlight 208 may have a suitable interweaving of the different colored emitters (208A, 208B etc.) to affect a pleasing (and even) white lighting across the entire display during field sequential processing.

It will be appreciated that these emitters may comprise one of many different types of narrow band color sources—such as, narrow band, specifically binned LED emitters, quantum dot, quantum dot enhancement film (e.g. QDEF™), laser light sources and the like.

Figure 3:
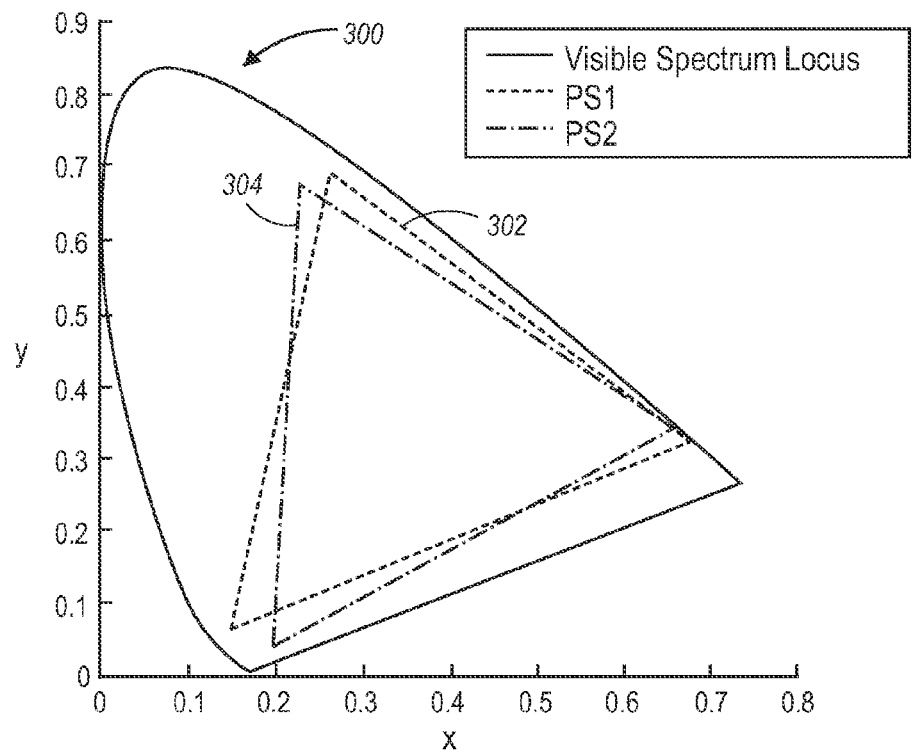
FIG. 3 depicts one embodiment of a temporal processing scheme that employs a backlighting system and scheme of FIG. 2.

Assuming this physical distribution of emitters along the backlight, then one embodiment of temporal processing may proceed as shown in FIG. 3. FIG. 3 depicts the CIE 1931 color space and two separate color gamuts presented by PS1 primaries (302) and PS2 primaries (304) in this example. With these two separate color gamuts now realizable, it is possible to employ them in a temporal fashion to effect an overall wider color gamut for the display system (i.e. than if the display had only a single color gamut, say PS1).

Figure 4A:
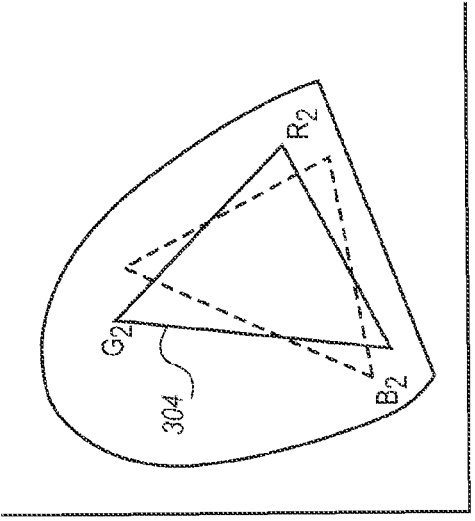
FIGS. 4A and 4B show the gamut effects of the backlighting system and scheme of FIG. 2 during two different time periods.
Figure 4A:
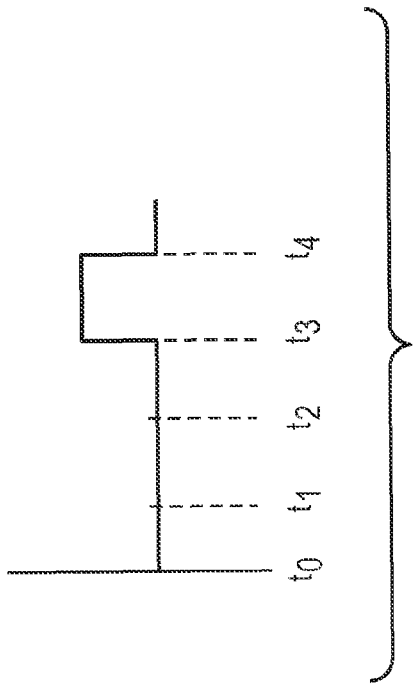
Figure 4B:
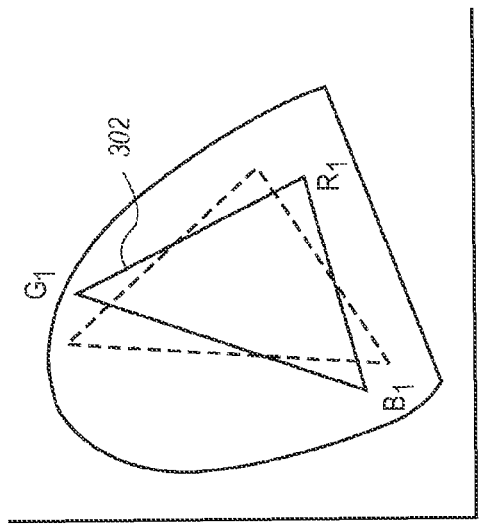
Figure 4B:
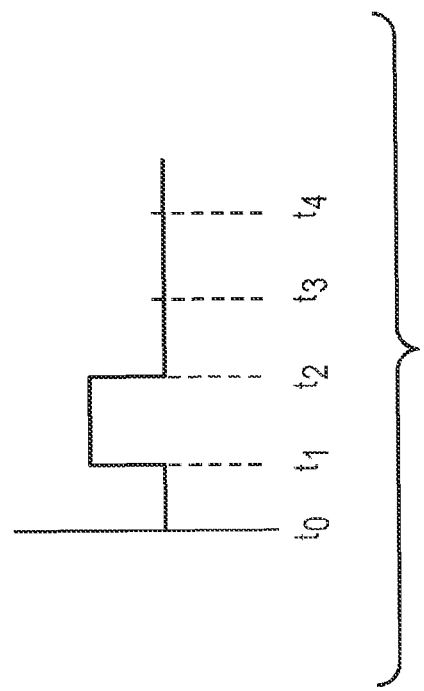

FIGS. 4A and 4B depict two separate time periods—one time period in which PS1 (302) is the active color gamut of the display system (e.g. using [R1, G1, B1] during one time interval of at least three frames) and another time in which PS2 (304) is the active color gamut of the display system (e.g. using [R2, G2, B2] during this second time interval of at least three frames).

Figure 5:
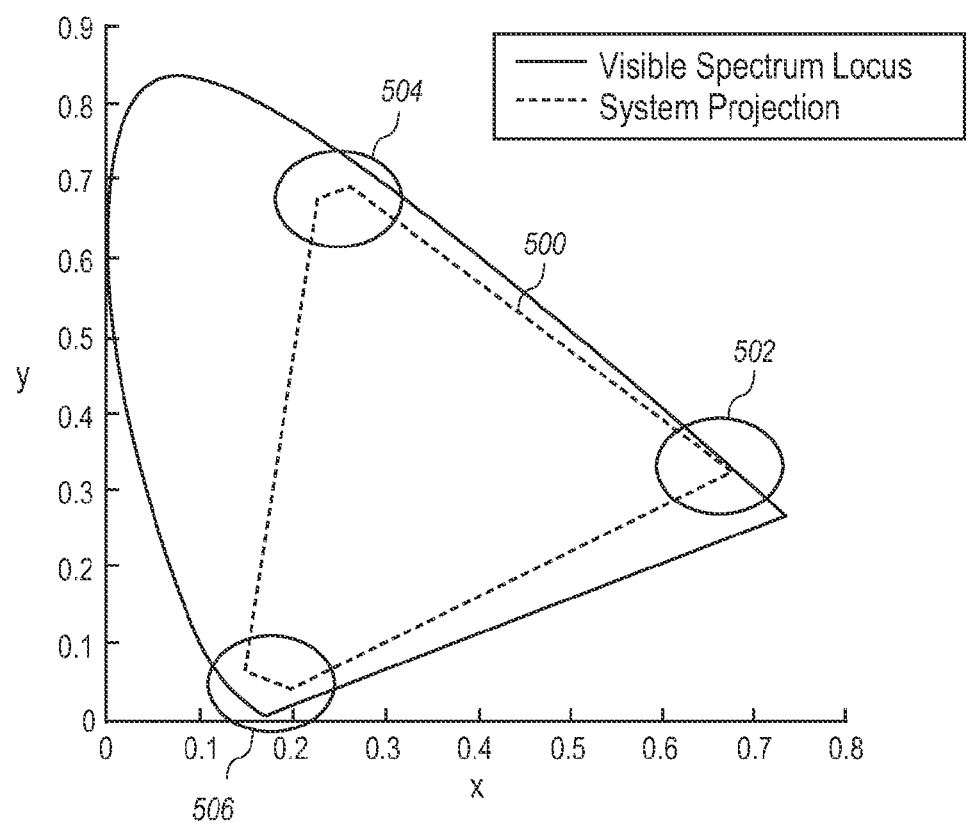
FIG. 5 shows the overall gamut performance of a backlighting system of FIG. 2.

The overall effect of this temporal, field sequential processing is shown in FIG. 5. It should be noticed that the gamut 500 of this display system now appears to have substantially 6 vertices (in regions 502, 504 and 506), corresponding to primary points R1, R2, G1, G2, B1 and B2. This wider gamut may more accurately approximate the color gamut representations found in theatrical content, such as a six primary color gamut.

Figure 6:
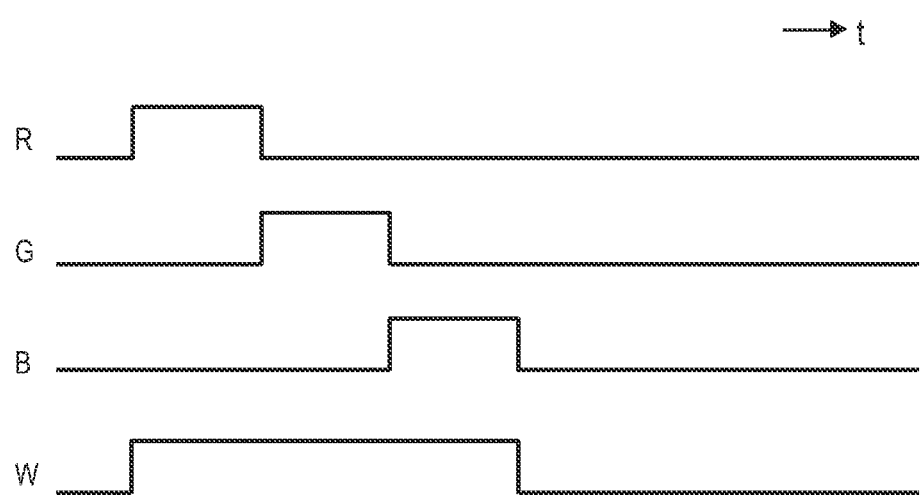
FIGS. 6 through 9 are different embodiments and variations of temporal backlighting schemes using the backlighting system of FIG. 2.

Many other variations and elaborations are now possible with such a field sequential display system. FIGS. 6 through 9 are different embodiments of field sequential processing schemes to reduce known undesirable effects of field sequential processing. FIG. 6 is one embodiment in which RGBW backlighting scheme is shown. RGBW backlighting may provide an opportunity to reduce and/or ameliorate the well-known and undesirable effect of color break-up. In FIG. 6, a white light (W) provides a base of luminance while R, G and B emitters may supply additional chrominance in the resulting image. This W light may be provided by the existing R, G, B emitters (or whatever color emitters there are in the backlight, including separate white emitters).

Figure 7:
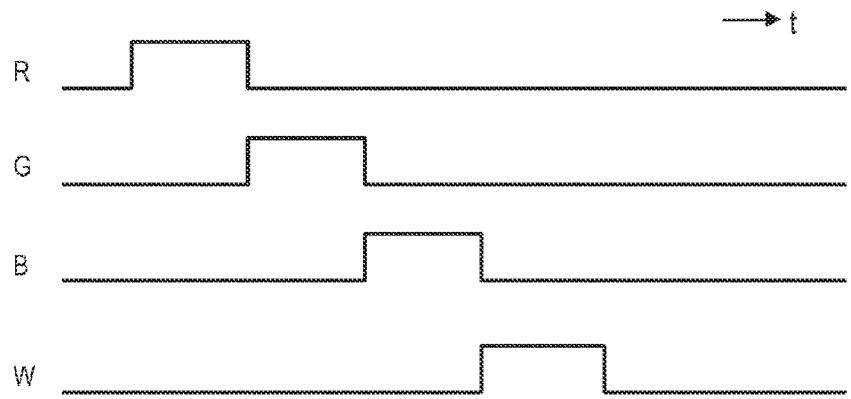
Figure 8:
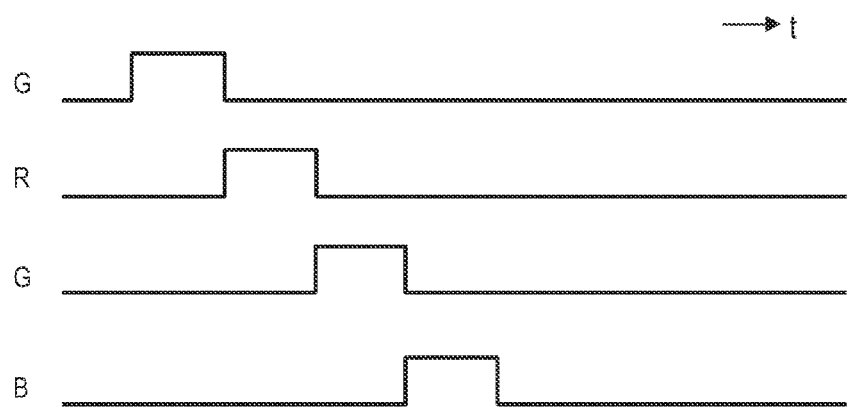

FIG. 7 shows another scheme for RGBW field sequential processing, in which one of the temporal slots is reserved for a W field. FIG. 8 is yet another field sequential scheme that may help reduce the effects of color break-up. In this embodiment, the G field is repeated in the field sequence. This concept of using repeated green primaries to reduce color break up can be extended to the embodiments described in FIG. 2 and FIG. 3. It suffices that a high-luminance color field (e.g. like green or other bright primary color, perhaps as a virtual primary) have a higher frequency in whatever illumination scheme affected by the controller to help abate color break-up, than other lower-luminance color fields (e.g. blue or red).

Figure 9:
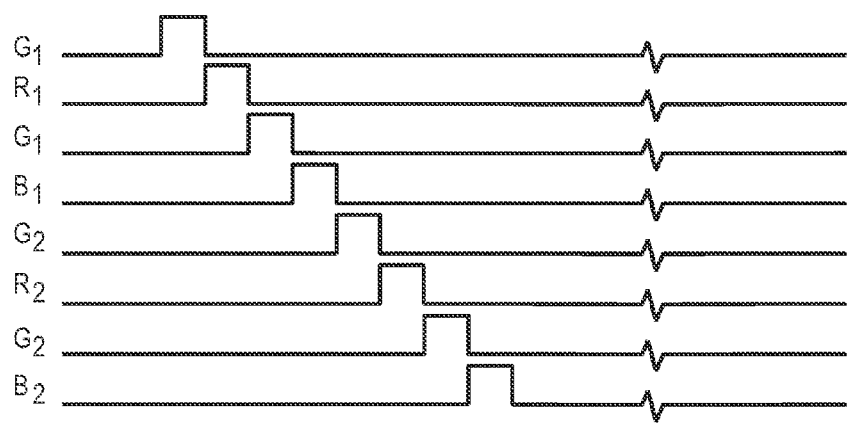

FIG. 9 is still yet another embodiment in which the G field is repeated; but this time in the context of two or more colored primary sets—e.g., P1 and P2. For such multi-primary backlighting schemes, it may be desirable to increase the backlighting refresh rate. For example, if the LCD displays are rated for 240 Hz, then the backlight may be refreshed at a minimum of 240 frames per second. Certain blue phase mode LCDs have been shown to be capable of clocking at such high frame rates.

Embodiments for Enhanced 3D Visual Effects

With the various embodiments of a dual modulator display system having edge-lit backlights, it is now possible to disclose systems and techniques for enhanced 3D visual effects, including autostereoscopic effects.

Figure 10:
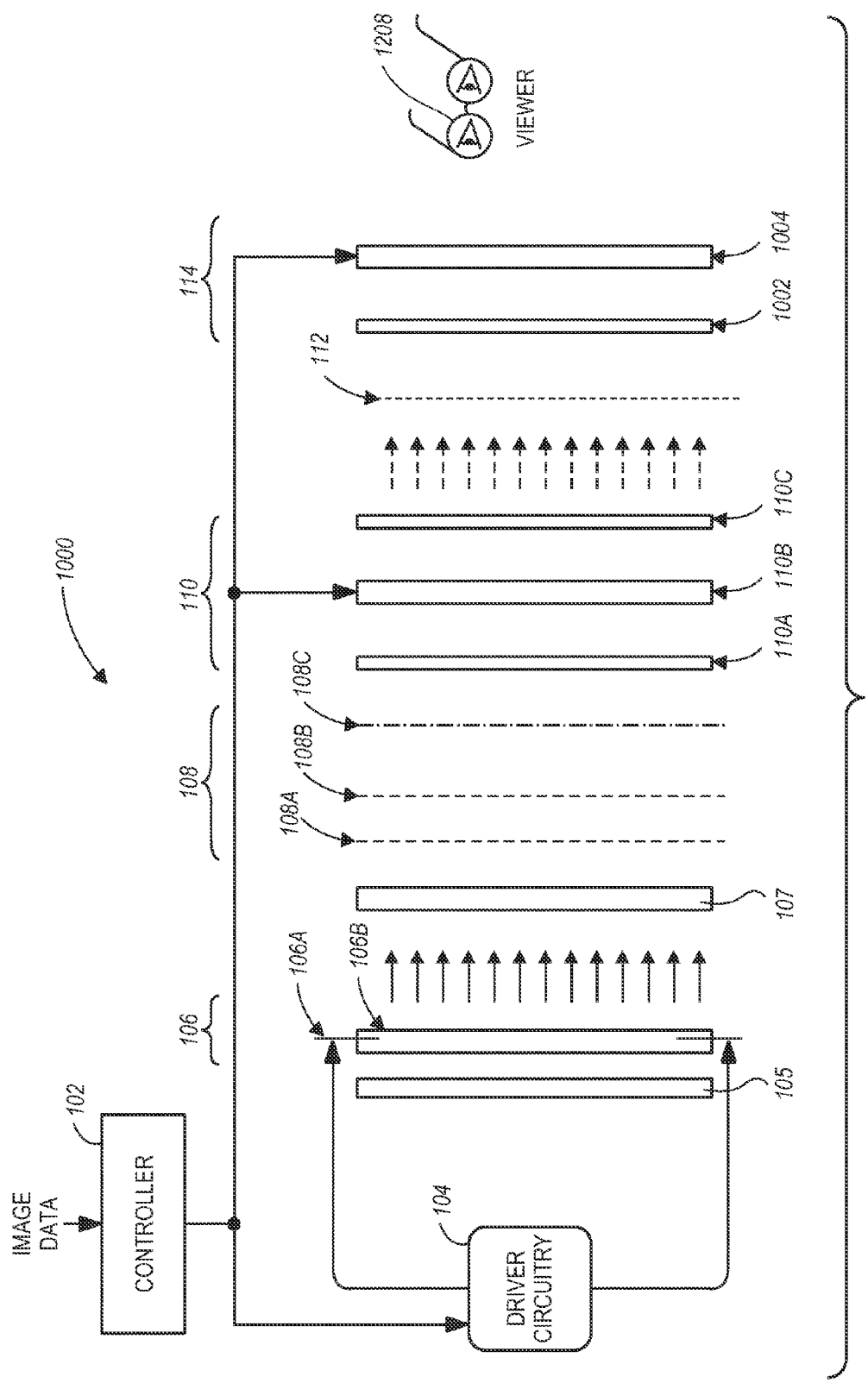
FIG. 10 is one embodiment of a dual or multiple modulator display system that affects 3D visual effects stereoscopically.

FIG. 10 is one embodiment of a dual modulator display system (1000) that shares many of the same elements as found in FIG. 1A display system. One difference between the two display systems is found at the second modulator 114. Second modulator 114 may comprise matched polarization analyzer 1002 and monochrome liquid crystal 1004.

Matched polarizer 1002 may be controlled to output images for respective right and left channels. The channels may be, for example, a left eye viewing channel or a right eye viewing channel that may be separated for viewing by stand-alone viewing glasses 1006 that include different filters for the left eye and right eye. For example, display 1000 could be energized to alternately display a left view and a right view of a 3D image. The images would then be separated into different corresponding viewing channels by energizing the additional controllable polarizer to polarize each of the images consistent with its viewing channel. For example, in a left and right polarization viewing system, the glasses 1006 could be constructed to include a P polarization filter on the left eye lens and an S polarization filter on the right eye lens. In such a case, controllable panel 1002 may be energized to pass/convert light modulated with left image data to a P polarization and pass/convert light modulated with right image data to S polarization.

In another example, the light may modulated with left or right image data in sections (e.g., light being emitted from the display at any given time contains parts of both a left and right channel image), and the controllable polarizer panel is also energized in sections and synchronized with the displayed image sections to convert those sectional images to the appropriate polarization and subsequent viewing through polarized filters by the left and right viewing channels.

Figure 11:
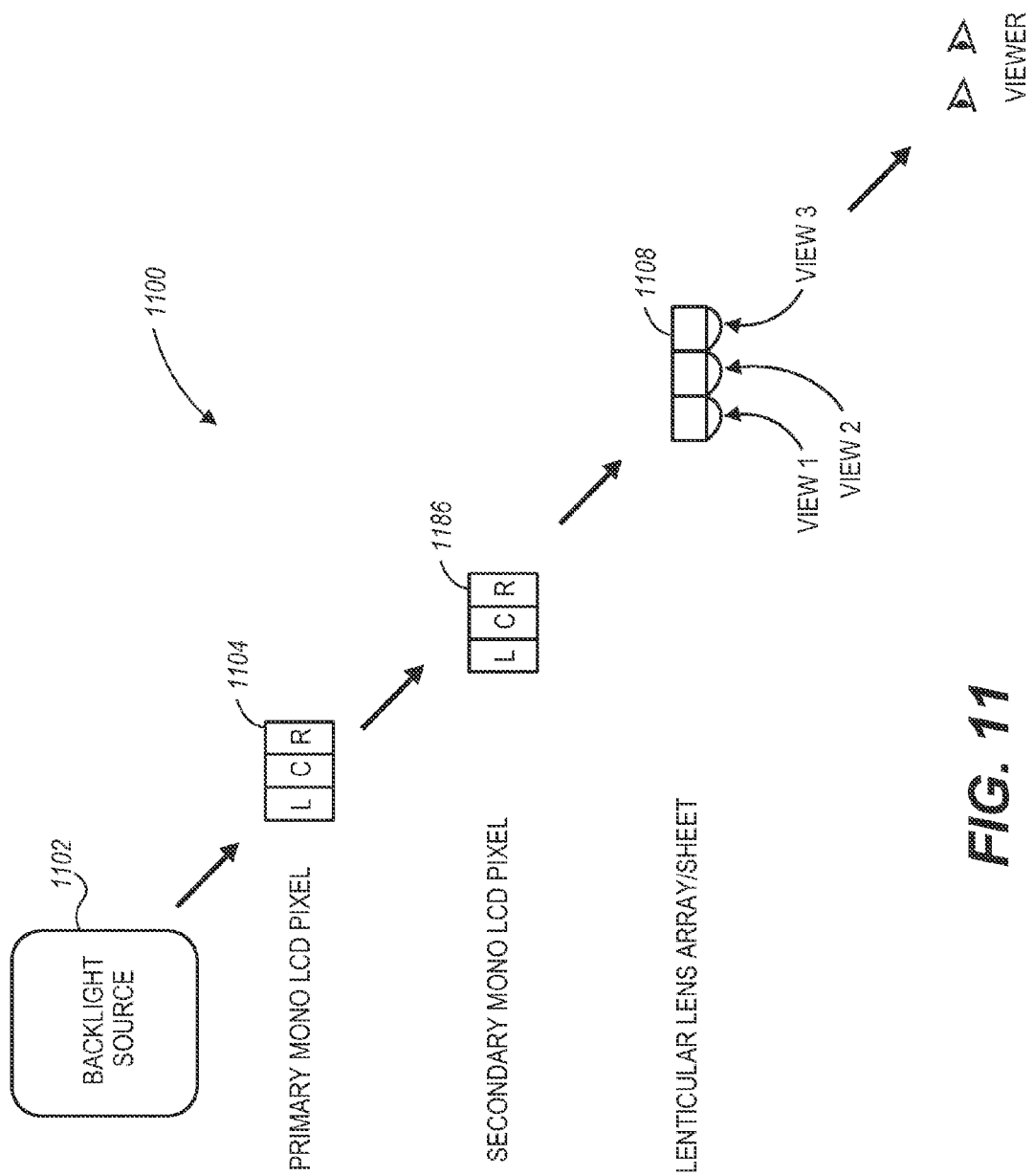
FIG. 11 shows one embodiment of a dual or multiple modulator display system that comprises a lenticular lens array for multi-view a utostereoscopy.

FIG. 11 is another embodiment of a dual modulator display system 1100 having high dynamic range and capable of affecting 3D images without the need of a matching set of glasses worn by a viewer. As is known in the art, it is possible to affect 3D viewing in an autostereoscopic manner. Some known systems are disclosed in: (1) United States Patent Application Publication Number 20110038043 entitled "SEGMENTED LENTICULAR ARRAY USED IN AUTOSTEREOSCOPIC DISPLAY APPARATUS"; (2) United States Patent Application Publication Number 20100118218 entitled "BACKLIGHTING SYSTEM FOR A 2D/3D AUTOSTEREOSCOPIC MULTIVIEW DISPLAY"; (3) United States Patent Application Publication Number 20100079584 entitled "2D/3D SWITCHABLE AUTOSTEREOSCOPIC DISPLAY APPARATUS AND METHOD"; (4) United States Patent Application Publication Number 20090207237 entitled "METHOD AND DEVICE FOR AUTOSTERIOSCOPIC DISPLAY WITH ADAPTATION OF THE OPTIMAL VIEWING DISTANCE"; (5) United States Patent Application Publication Number 20030025995 entitled "AUTOSTEREOSCOPIE"—all of which are incorporated by reference herein in their entirety.

In this embodiment of FIG. 11, backlight source 1102, such as an edge-lit, field sequential backlighting system as depicted in FIG. 2 or any other suitable backlight, may provide backlight for a dual modulator system such as, for example, depicted in FIG. 1A, or as shown in any another other dual modulator display in any of the commonly-owned patent applications incorporated by reference above.

Each pixel structure 1104 in the first and/or primary modulator (e.g. monochrome LCD) may be designated as left (L), center (C), or right (R) viewing—or however many different viewing areas are designated. The light from these pixel structures 1104 are matched with pixel structures in second and/or secondary modulator (e.g. another monochrome LCD).

As light emanates from the secondary pixel structure 1106, the light is further conditioned with a lenticular lens array and/or sheet 1108. Lenticular array 1108 affects the various light paths to the various viewing areas—e.g. left, center and right viewing areas, as seen by the viewer. As may be appreciated, this display system comprising a dual modulator, with both modulators comprising monochrome subpixels, allows for a brighter image due to the lack of usual reduction in brightness from colored subpixels. Also, the presence of LCR subpixels effectively provides for 3 distinct views without reducing the resolution of the displayed images. In addition, with the enhanced temporal and/or field sequential backlights with enhanced gamut performance, would allow higher chrominance fidelity for movies and other image sources where fidelity is a part of the viewer's experience. The resolution and/or dimensions of the lenses within the lenticular array/sheet may be optimized such that the lenses are the substantially the same size as that of the subpixel width.

Figure 12:
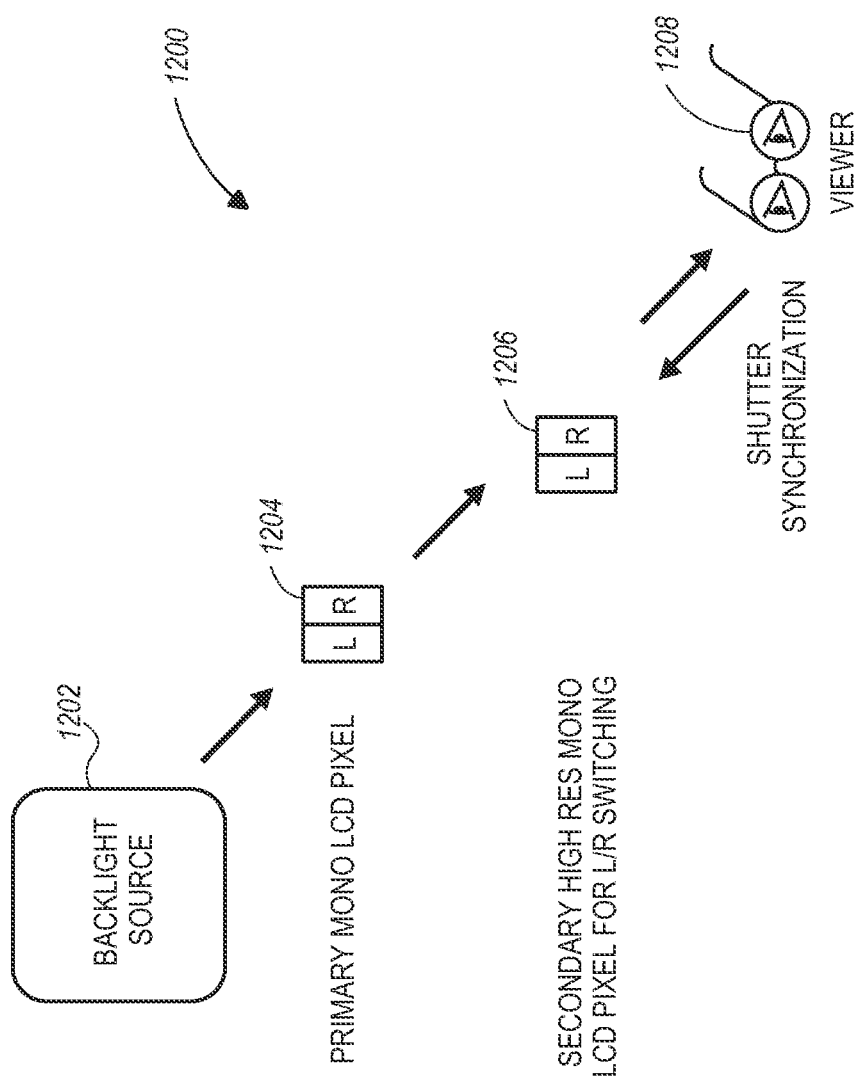
FIG. 12 shows one embodiment of a dual or multiple modulator display system that utilizes active shutter glasses to affect 3D viewing.

FIG. 12 is yet another embodiment of a dual modulator display system 1200 in which light from a suitable backlight 1202 is transmitted through a first or primary monochromatic pixel 1204 and then through a secondary monochrome pixel 1206. The secondary monochrome LCD pixel may function as a switch [ON/OFF] at multiple (for one example, twice) the frame rate of the primary monochrome LCD pixel. The shutter LCD may be synced to the active shutter eye wear 1208 so that alternating pixels are viewed by either one of the eyes to create the 3D viewing experience. Alternately, the secondary monochrome LCD can function in tri-state where it alternates between $L_{on}R_{off}$, $L_{off}R_{off}$ and $L_{off}R_{on}$. This may allow for cross-talk reduction in active shutter glass based 3D viewing.

Figure 13:
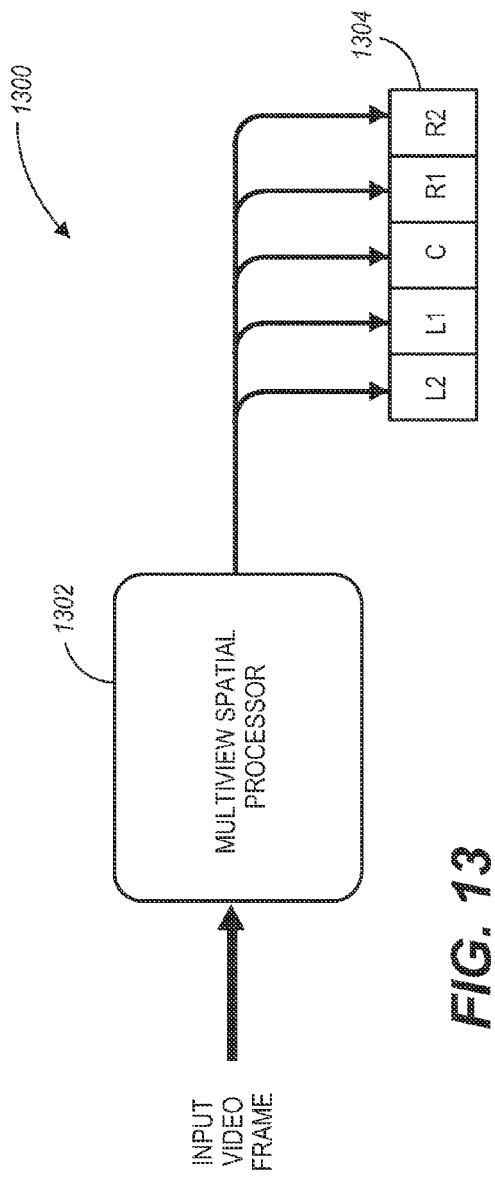
FIG. 13 shows one embodiment of an input stereoscopic video sequence or still image frame may be used to create multiple views on a display system such as shown in FIG. 11.
Figure 14:
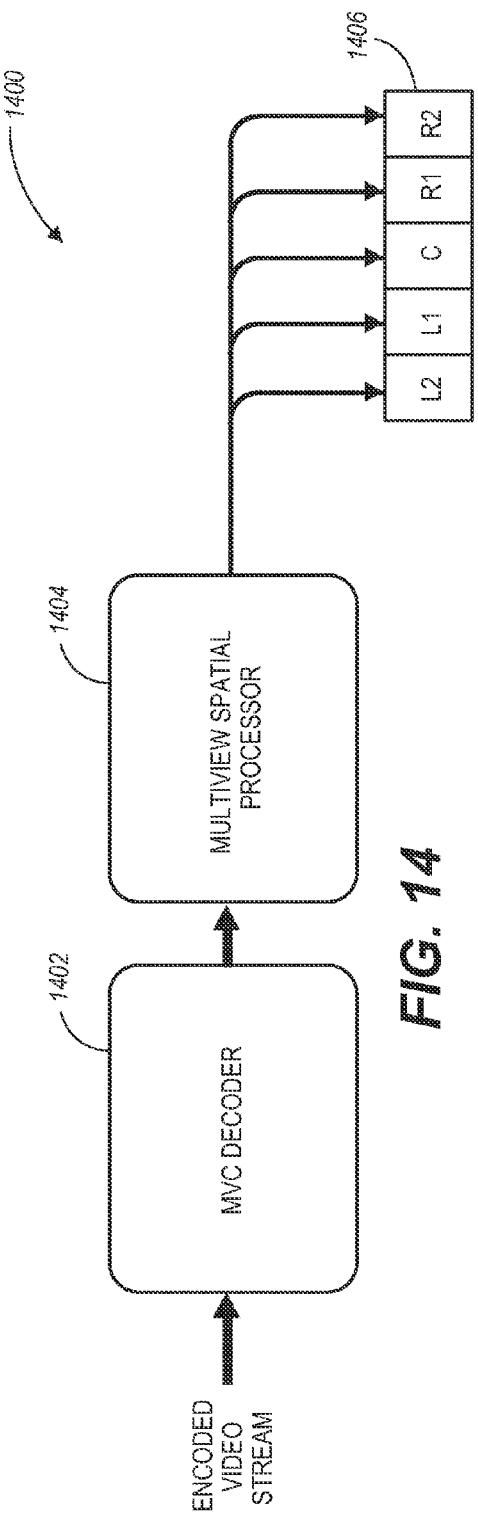
FIG. 14 shows one embodiment in which the system of FIG. 13 further comprises a multi-view codec for displaying multi-view autostereoscopic video sequences and frames.

FIGS. 13 and 14 are two embodiments of an image processing pipeline for a dual modulator display system that might render 3D images, such as found in autostereoscopic systems, e.g., FIG. 11 or in system such as FIG. 12. Image pipeline 1300 inputs stereo frame from a video sequence to synthesize and render multiple views of the scene which may be optimized for a particular multiview 3D system that uses the embodiments in FIG. 11.

Spatial processor 1302 is seen outputting multiple channels of image data—in this embodiment, five channels: L2, L1, C, R1 and R2—thereby creating five views for autostereoscopy. These five channels may be employed as different views, to affect 3D viewing—as is known in the art.

FIG. 14 is yet another embodiment of an image processing pipeline 1400 wherein an MVC decoder 1402 is added as a pre-processing step to construct bitstreams that represent more than one view of a video scene—as done, for example, in stereoscopic 3D viewing. The MVC decoder 1402 decodes from up to 16 views of the scene into N views (where N may be any number less than or equal to 16) that are presented on the autostereoscopic display, as described, e.g., in FIG. 11.

Novel White-Light Background Edge Lighting Techniques

Figure 15:
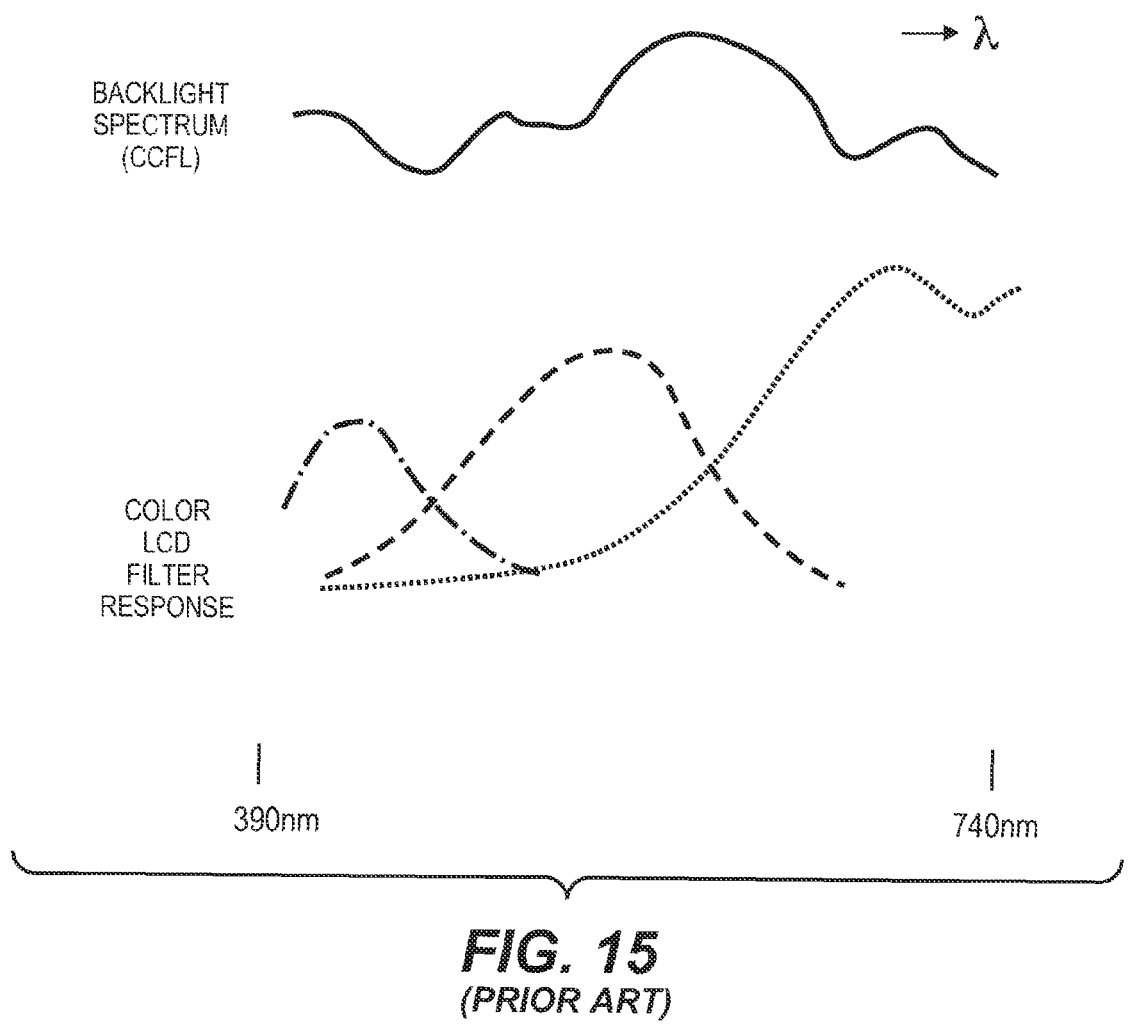
FIG. 15 shows the spectral content and performance of conventional CCFL backlight and conventional colored filter arrays used in standard LCDs.

In continued reference above about dual modulator display systems comprising two monochrome LCDs and a white-light (or broad spectrum) source of light. FIG. 15 shows the spectrum of a conventional CCFL white light. It will be seen that there are some peaks and trough associated with such CCFL spectrum. In addition, FIG. 15 shows the typical color filter response from a conventional LCD with colored subpixels. It may be seen that there is some cross-talk (or bleed-through) of illumination in some parts of one color band (e.g., blue) into and through another color band, (e.g. a green colored subpixel). The result of which—i.e., once the CCFL light is filtered by conventional colored subpixels in a LCD—is that the resulting illumination may still be an uneven one overall, still showing some peaks and troughs of color spectrum illumination. The color gamut represented by such a system would be limited to the choice of the color filters in the LCD.

Figure 16:
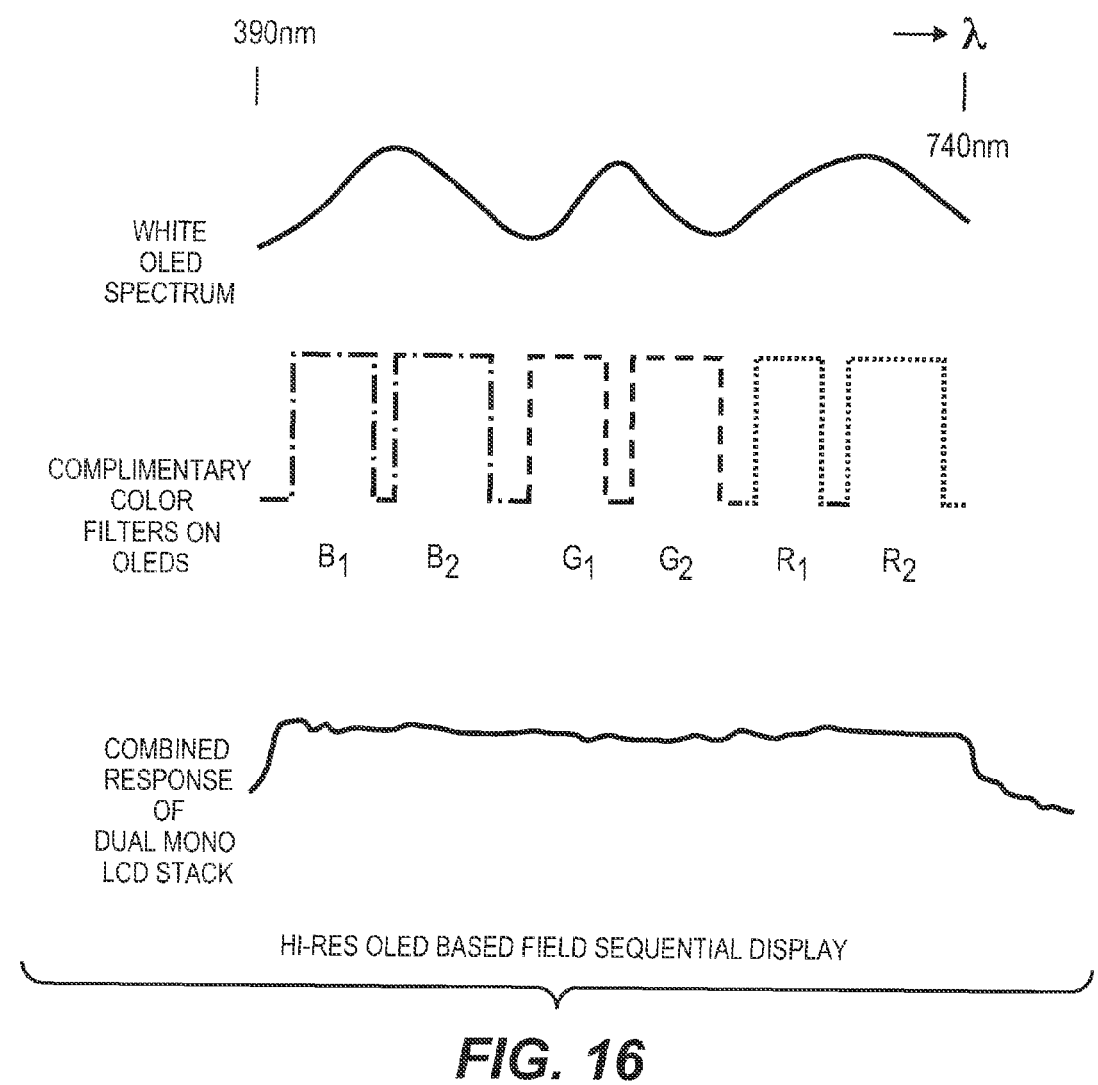
FIG. 16 shows one embodiment of the spectral performance of OLED emitters, either broad spectrum or RGB, together with matching color filters to give even illumination across a broad spectrum.

FIG. 16 shows one possible embodiment of using specific colored filters on backlights using either narrowband or broadband emitters for lighting. In the case of narrowband, the emitters may be LED, OLED, laser, quantum dots enhancement films or the like. In the case of broadband, the emitters may be LED, OLED, CCFL or the like. When the spectra of these emitters are combined, the result is a substantially white source or broad spectrum source of light. For example, FIG. 16 shows a white spectrum as produced by OLED emitters that exhibits its particular peaks and troughs over the visible spectrum as shown. If suitable color filters were employed over this OLED white source in a complementary fashion—i.e., tune the band pass for the light sources with choice of for example, B1, B2, G1, G2, R1 and R2 filters, such that the peaks and troughs in the visible spectrum may be compensated for with a desired band pass, then the combined response of the white source OLED emitters, together with suitably chosen color filters, would exhibit a reasonably smooth illumination across the entire visible spectrum.

As may be noted in reference to FIG. 2 above, if two or more sets of primary colored filters are constructed such that each set may produce a broad (e.g. white) spectrum, then these two or more sets of primary colored filters may provide the novel field-sequential illuminations. The resulting overall gamut of each of these sets of primary colored filters may provide a wider gamut performance than if the display system were to use just one of these sets of primary colored filters.

It will be appreciated that, although many embodiments described herein are applicable to edge-lit backlighting systems, many of these systems and techniques are also applicable to direct-view backlighting that may have the potential for affecting a field-sequential illumination.

In one embodiment, the two sets of primary colored filters may be specifically selected in their band passes to be complementary to enable spectral separation 3D viewing. In such a case, then viewers wearing spectral separation glasses would be able to view images in 3D in such a display system. Spectral separation 3D viewing and systems are known in the art—e.g., in United States Patent Application Publication Number 20110205494 entitled "SPECTRAL SEPARATION FILTERS FOR 3D STEREOSCOPIC D-CINEMA PRESENTATION", which is hereby incorporated by reference in its entirety.

Improved Display with MEMS and/or IMOD Components

It is known from the '241 application and the '395 application (both incorporated by reference above) to employ MEMS and/or IMOD components, substrates and/or backplanes—together with an optical stack—to create displays. In many embodiments disclosed herein, such MEMS and/or IMOD backplane may be employed in a configuration that may exhibit similar high dynamic range as is shown in embodiments—e.g., in FIGS. 1A and 10 of the present application.

Edge-Lit Backlight Embodiments

Figure 17:
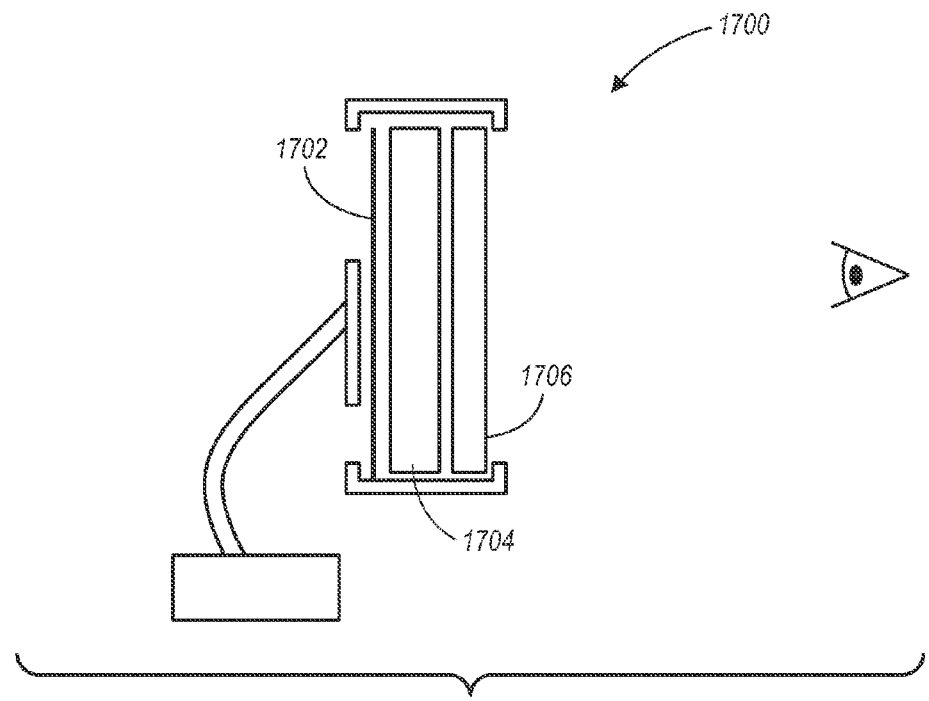
FIG. 17 depicts one possible display system comprising a MEMS/IMOD component as one of the modulators in a dual and/or multi-modulator display.

FIG. 17 is one embodiment of a display 1700 comprising a MEMS/IMOD backplane 1702, backlight module 1704 and a modulator stack module 1706. In one embodiment, the backlight module may comprise a white light source—e.g., CCFL, white LEDs, white OLED, quantum dot based or the like. Such a white light source may be implemented in an edge lit configuration and may be configured to be fully on, globally dimmed or locally dimmed, as is known in the art. In another embodiment, backlight module may comprise a set of colored light sources—e.g., colored LED sets or arrays. They may also be configured in an edge lit fashion and may be configured to be fully on, global dimmed or locally dimmed, as known in the art.

Modulator stack 1706 may comprise one, two or more modulators (e.g., LCD modulators or the like). In one embodiment, one LCD modulator, together with other optical elements, comprise an optical stack that is configured to receive light reflected from MEMS/IMOD backplane 1702. MEMS/IMOD backplane may be configured (as will be discussed in greater detail herein) to affect a first modulation of light emanating from the backlight and transmitted such modulated light to modulator stack 1706—to produce, e.g., a high dynamic range display system. In another embodiment, a wide color gamut display system may be affected by such a display, possibly employing a field sequential scheme as described herein.

Figure 18:
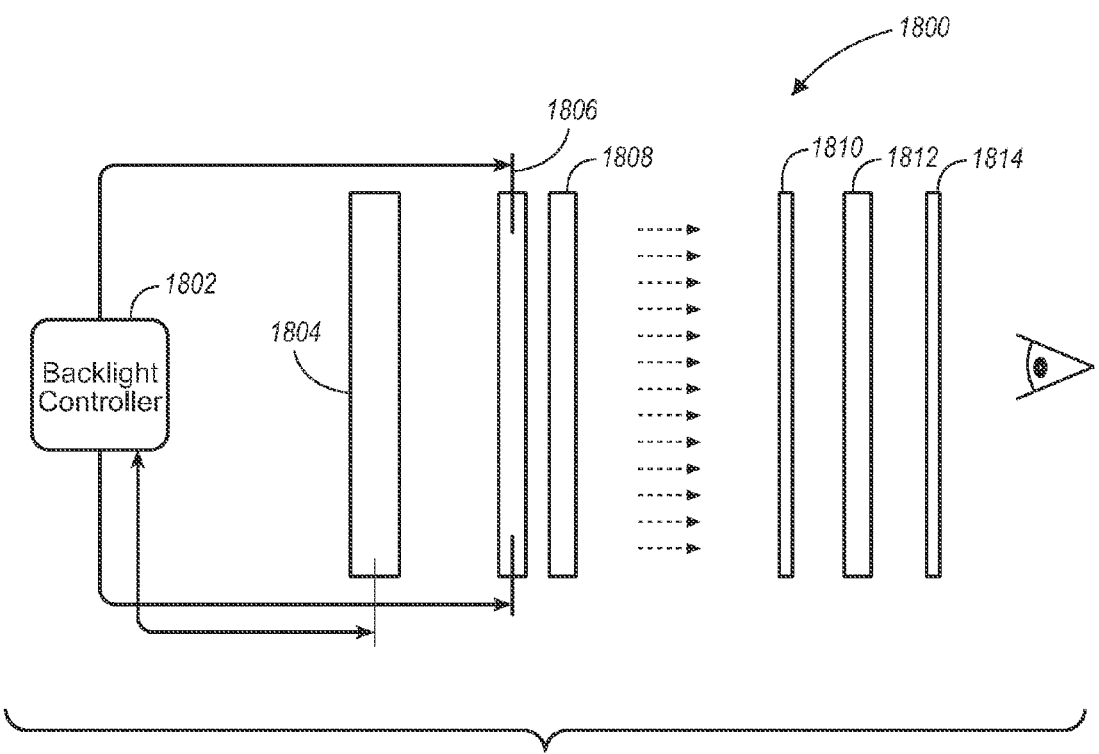
FIG. 18 is a display sub-system comprising a MEMS/IMOD reflective component.

FIG. 18 is another embodiment of a display sub-system made in accordance with the principles of the present application. Display 1800 may comprise a backlight controller 1802, MEMS/IMOD backplane 1804, backlight 1806, diffuser 1808, analyzer polarizer 1810, LCD modulator 1812 and realizer polarizer 1814. Sub-system may be under processor control (such as controller 102 in to FIGS. 1A and 19) that receives input image data and provides sufficient processing under processor control to drive backlight controller 1802 and LCD modulator 1812 sufficiently to render high dynamic range images to a viewer of the display. It should be appreciated that MEMS/IMOD structure may have a resolution that is different from that of the LCD modulator.

In FIG. 18, light exiting the backlight 1806 (e.g. an edge LED array) is incident on the MEMS/IMOD backplane 1804. Backplane 1804 may work in as interferometric reflectance modulator, as described in the '241 application and the '395 application. Backplane 1804 may be used to reflect selective parts of the spectrum by tuning the optical resonant cavity of the interferometric modulator.

The light at the front of the diffuser 1808 may be spectrally separated for wider color gamut capability. The use of interferometric modulators with interferometric reflectors may allow for further spectral separation. This light is incident on the LCD modulator and/or panel 1812 which then may act as a secondary modulator to provide higher dynamic range display capability. In one embodiment, modulator 1812 may be an achromatic LCD panel. Alternatively, modulator 1812 may be an LCD panel comprising some colored subpixel pattern—e.g., striped, Pentile, RGB primary, RGBW primary, n-colored primary (where n is greater than or equal to 3) or the like.

As mentioned, the backlight driver and/or controller may drive the edge LEDs and the control for the interference modulator. Hence, this driver may be used to modulate the intensity and the spectrum of the backlight output in front of the diffuser. In another embodiment, the backlight controller may be integrated with an optional sensor 1814 so that the current drive to the edge lit LEDs may be modulated based on the amount of ambient light so that the brightness of the content displayed may be maintained at the right luminance level regardless of the ambient light conditions. The light output from the diffuser may be further modulated by the achromatic LCD pixels for higher contrast display.

Backlit Embodiments

Figure 19:
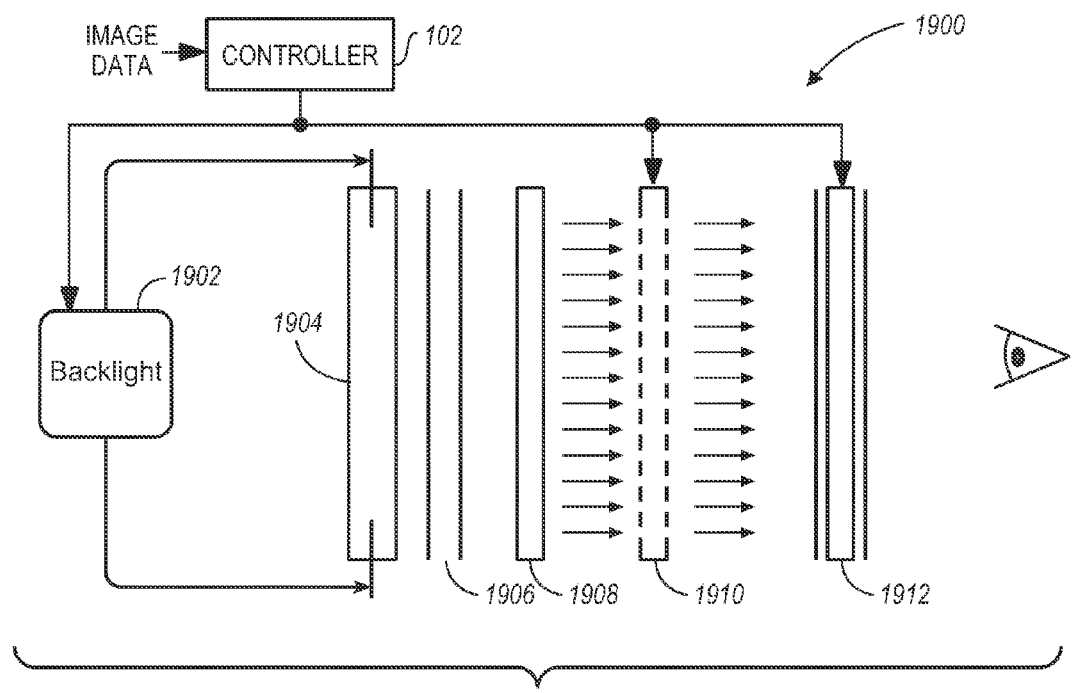
FIG. 19 is a display system comprising a MEMS/IMOD transmissive component.

As is disclosed in the '395 application, MEMS/IMOD components may be constructed to work in a transmissive mode (i.e., as opposed to a reflective mode only). FIG. 19 depicts one embodiment of a backlit display system. Display 1900 may comprise backlight controller 1902, backlight 1904, optional collimator films 1906, transmissive MEMS/IMOD component 1908, other optional transmissive MEMS/IMOD components 1910 and a LCD layer and/or stack 1912 as another modulator in the optical path. As mentioned, display system may be under control by controller 102, accepting image data and providing control signals to the active elements in the display system—e.g., backlight, transmissive MEMS/IMOD components, LCDs and the like.

Backlight 1904 may comprise any suitable backlighting—e.g., an array of LEDs (white and/or colored), CCFL, OLED, quantum dot or the like. The light from the backlight impinges on transmissive MEMS/IMOD component 1908—where the light may receive a first modulation by component 1908. As will be discussed further herein, MEMS/IMOD component 1908 may have different embodiments and constructions that may affect different spectral characteristics.

In some embodiments, there may be another one or more optional transmissive MEMS/IMOD component 1910 in the optical path to provide additional modulations of the light. After such optional modulation, the light may be transmitted through an LCD modulator stack 1912, said stack having the optional optical elements (e.g., polarizers, finishers and the like) that may augment LCD panel itself.

In other embodiments, the MEMS/IMOD components may be constructed to operate in a transflective mode—as further disclosed in, e.g., United States Patent Application 20090126777 to Khazeni et al., published May 21, 2009 and entitled "SIMULTANEOUS LIGHT COLLECTION AND ILLUMINATION ON AN ACTIVE DISPLAY"—which is hereby incorporated by reference.

Wide Color Gamut Embodiments

In many embodiments, different MEMS/IMOD backplanes may be constructed to reflect a desired wavelengths, but having a somewhat differently shaped peaks centered about the desired wavelengths.

Figure 20:
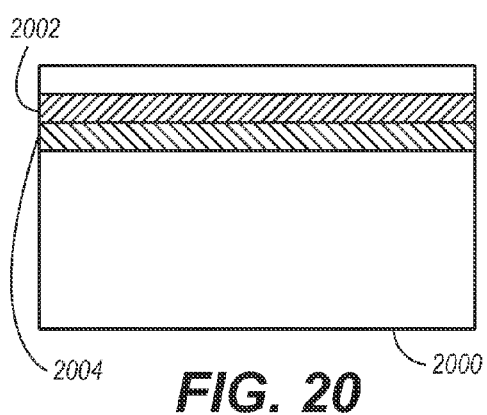
FIGS. 20 and 22 are two embodiments of a display system that may partition the backplane with two or more IMOD components having different spectral properties.

FIG. 20 depicts one such different MEMS/IMOD backplane. As may be seen, the rows of the backplane may comprise different interference modulators (IMODs) with different interference characteristics. These components may be laid out as horizontal stripes along the display plane. Each horizontal stripe may be used for IMODs with interferometric component with a different cavity depth and different thickness and/or material. This configuration would create a more spectrally separated light source and hence allow for wider color gamut representation at the backlight.

In further reference to FIG. 20 and as there shown, backplane 2000 may comprise a plurality of different MEMS/IMOD components—e.g., IMOD1 (2002) and IMOD2 (2004) as shown. The different MEMS/IMOD backplanes may exhibit different spectral characteristics—thus, leading to a modulated backlight of a wider color gamut than if the MEMS/IMOD backplane were made of a uniform component construction. As may be seen, the MEMS/IMOD backplane may be constructed with alternating stripes of the MEMS/IMOD components. As these components may vary in size (from 0.1 micron to 100s of microns), a MEMS/IMOD backplane may vary in resolution and/or color gamut depending on the choice of components and their physical dimensioning.

Figure 22:
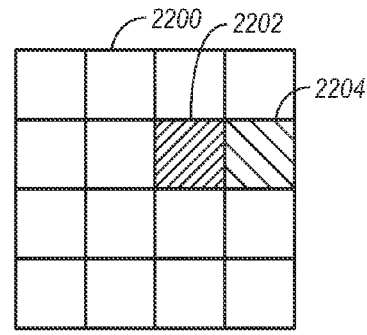

FIG. 22 depicts yet another example of a MEMS/IMOD backplane 2200 configuration. Backplane 2200 may comprise a checkerboard of a plurality of potentially different MEMS/IMOD components (e.g., 2202 and 2204 respectively). As mentioned above, the resolution and/or color gamut may vary depending on the choice of components and their physical dimensioning. It will be appreciated that the pattern and placement of the plurality of MEMS/IMOD components (possibly having different spectral characteristics) are contemplated, including but not limited to: stripes, checkerboard patterns, Pentile patterns, any spatial multiplexing patterns, other partitions of the backplane and the like. Each pattern, portion and/or subset of the partition may be comprised of MEMS/IMOD components having different spectral characteristics, as described herein.

The configuration of FIG. 22 may also be used to disclose an additional embodiment. Backplane 2200 may be constructed as an n×n "MEMS pixel"—which may comprise of multiple adjustable etalon based bichromic cells 2202. With such a configuration, backplane 2200 (e.g., as constructed as an n×n array of bichromic cells) may allow for higher bit resolutions that that of an individual bichromic cell. Hence, it may be possible to design for a desired tradeoff of spatial and bit resolutions to allow for accurate representation of high bit depth content of IMOD-based displays at acceptable spatial resolutions.

Figure 23:
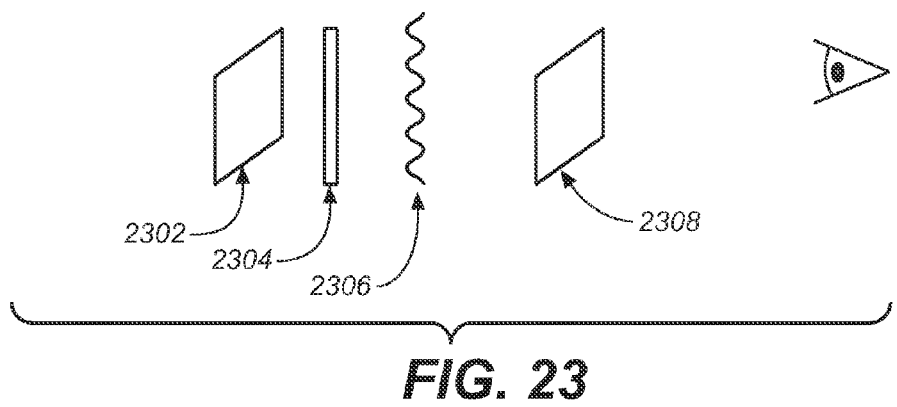
FIG. 23 is one embodiment of a display system wherein the display comprises a desired alignment between a IMOD component and an LCD subpixel.

FIG. 23 depicts one display embodiment comprising such cells. As shown, it may be desirable to have substantially a good boundary alignment (possibly 1:1 alignment for one cell and one subpixel or a group of subpixels) and bonding (as depicted as 2306) between the bichromic cell 2302 and one or more achromatic subpixels 2308 of the LCD or the bichromic cell of a transmissive IMOD. An additional light diffuser 2304 may be placed in between. The display of FIG. 23 may achieve an efficient high dynamic range display at high resolutions with improved level precision.

Spectral Performance of Different MEMS/IMOD Components

Figure 21A:
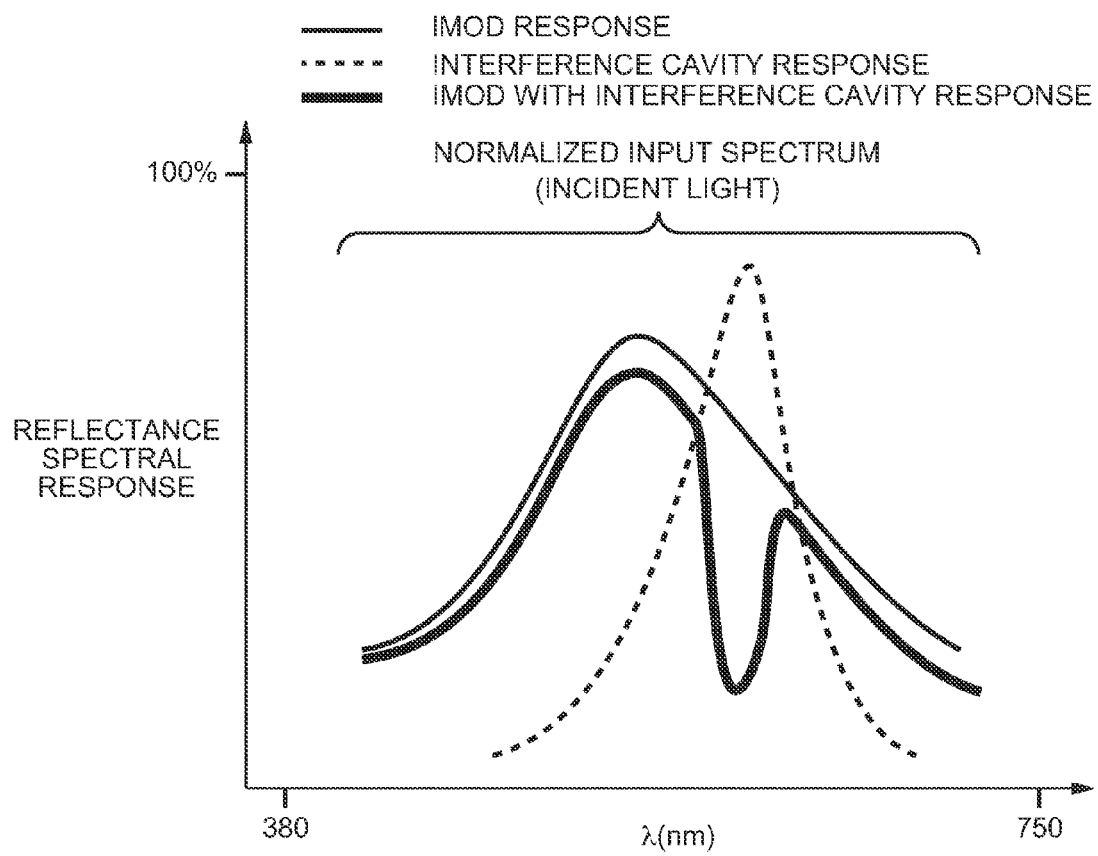
FIG. 21A depicts one spectral response of a conventional IMOD reflective component.

FIG. 21A depicts one such spectral response of an IMOD, as detailed in the discussion regarding FIG. 11A in the '241 application. Following the discussion in the '241 application, it is disclosed therein: FIG. 11A is a diagram illustrating a light reflectance curve for light reflecting from the substrate side of an interferometric modulator that includes an interferometric reflector. FIG. 11A also shows a light transmittance curve for light passing through the interferometric reflector. The interferometric modulator used to create FIG. 11A includes an absorber layer that is about 50 angstroms thick and an optical resonant cavity that is about 2440 angstroms thick. The interferometric reflector includes a first reflective layer formed of aluminum having a thickness of about 15 angstroms an optical resonant layer formed of SiON having a thickness of about 1300 angstroms and a second reflective layer formed of aluminum having a thickness of about 30 angstroms. The light reflectance curve includes a dip and the light transmittance curve includes a peak.

Figure 21B:
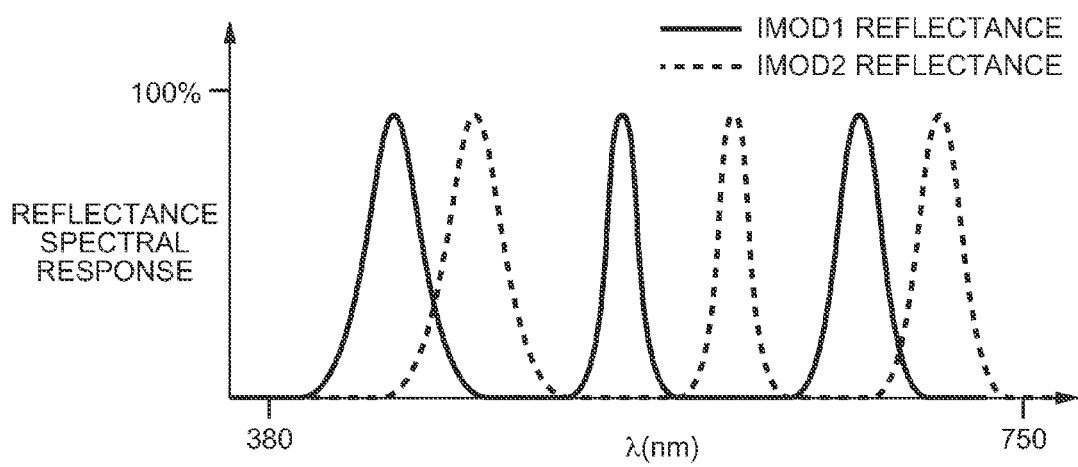

In other embodiments, the introduction of the intereferometric reflector to the backend of the interferometric modulator may allow for further fine tuning of the reflectance spectrum to produce a triple or multiple peaked spectrum where the magnitude and the full width at half magnitude [FWHM] of the peaks can be controlled by tuning the following: (1) thickness of the optical resonant cavity of the IMOD; (2) thickness of the absorbing layer; (3) thickness of the first and second reflector in the interference reflector and/or (4) thickness of the optical resonant layer of the interference reflector. FIG. 21B depicts one such spectral response of a triple peaked spectrum—and may include six peaks from a IMOD 1 AND IMOD 2 backplane structure. In addition to working as a reflector, the '395 application discloses that these IMOD structures may work in a transmissive mode. Therefore, all of the embodiments of a display system disclosed herein with an edge-lit backlight may place the backlight behind the transmissive IMOD structure and that light be processed further down the optical path by an LCD modulator.

Figure 24:
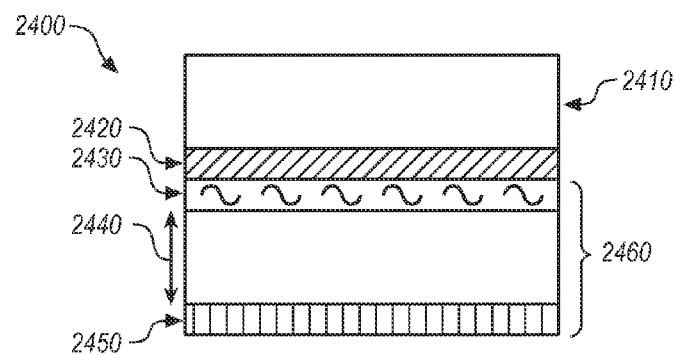
FIGS. 24, 25 and 26 are prior art MEMS/IMOD components that may suffice for some embodiments of display systems.
Figure 25:
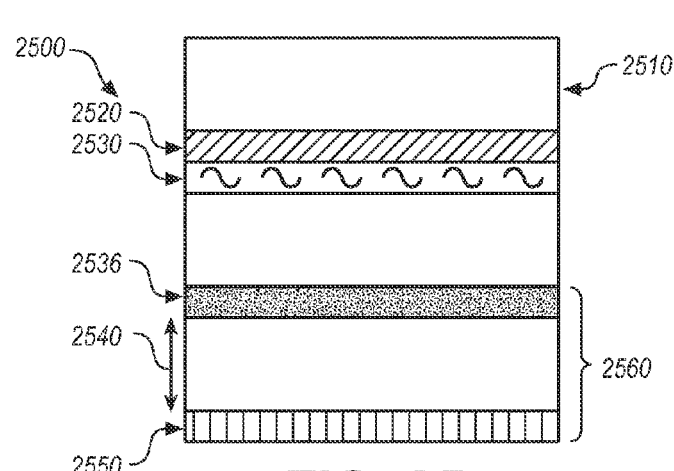
Figure 26:
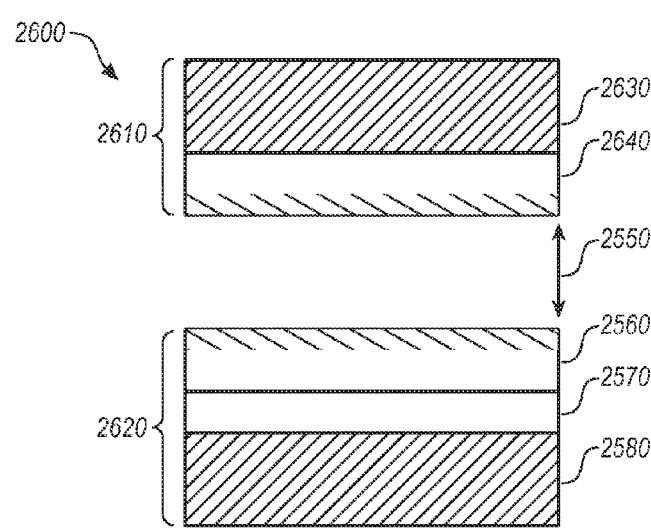

FIGS. 24, 25 and 26 are prior art MEMS/IMOD structures that may suffice for the purposes of the present application. The structure in FIG. 24 is similar to the structure shown in FIG. 8A of the '241 application. For ease of reading the description in the '241 application, the following elements of FIG. 24 map to the elements of FIG. 8A as follows: (2400, 800), (2410, 801), (2420, 803), (2430, 805), (2440, 821), (2450, 809), (2460, 821).

Following the discussion there, FIG. 24 (FIG. 8A) is a cross-sectional view of an embodiment of an interferometric display 800 including an interferometric modulator ("IMOD") 811. The IMOD 811 can be disposed adjacent to a substrate layer 801. The substrate 801 can comprise any suitable substrate, for example, acrylic, glass, polyethylene terephthalate ("PET"), and/or polyethylene terephthalate glycol ("PET-G"). An IMOD 811 can include an absorber layer 803, a reflector layer 809, and an optical resonant cavity layer 821 defined between the absorber layer 803 and the reflector layer 809. The reflector layer 809 can move through an air gap 807 in a direction generally perpendicular to the absorber between an open state (shown) and a closed state as discussed above with reference to FIG. 1. The interferometric modulator 811 can be configured to reflect a color, for example, red, green, or blue, from the substrate 801 side toward one or more viewers when the reflector 809 is in the open state and can be configured to reflect a dark color, for example, black or dark blue, when the reflector is in the activated state.

In the embodiment shown in FIG. 8A, the absorber layer 803 defines the top of the optical resonant cavity 821 and the reflector layer 809 defines the bottom of the optical resonant cavity 821. The thickness of the absorber 803 and reflector 809 layers can be selected to control relative amounts light reflected by the interferometric reflector 811 and light transmitted through the interferometric modulator 811. The thickness of the absorber 803 can range ±rom about 40 A to about 500 A. The thickness of the reflector layer 809 can range ±rom about 40 A to about 500 A. In some embodiments, the absorber 803 and reflector 809 can comprise materials that are reflective and conductive. Both the absorber 803 and reflector 809 layers can comprise metal, and both can be partially transmissive. The absorber layer 803 can comprise various materials, for example, molybdenum (Mo), titanium (Ti), tungsten (W), and chromium (Cr), as well as alloys, for example, MoCr or PbSe. The reflector layer 809 can comprise various materials, for example, aluminum (Al), copper (Cu), silver (Ag), molybdenum (Mo), gold (Au), and chromium (Cr), as well as alloys, for example, MoCr.

The amount of light reflected or transmitted through the reflector layer 809 can be significantly increased or reduced by varying the thickness and the composition of the reflector layer 809. The resulting color of light reflected from the interferometric modulator is based on light interference principles which are affected by the size (e.g., thickness) of the optical resonant cavity 821 and the material properties of the absorber layer 803. Changing the reflector thickness 809 will affect the intensity of the reflected color and thus influence the intensity of transmissions through the reflector 809.

In some embodiments of IMODs, the optical resonant cavity 821 is defined by a solid layer, for example, an optically transparent dielectric layer (e.g., SiON), or a plurality of layers. In other IMODs, the optical resonant cavity 821 is defined by an air gap, or the combination of an optically transparent layer 805 and the air gap 807. The thickness of the optical resonant cavity 821 can be tuned to maximize or minimize the reflection of one or more specific colors from the IMOD. In some embodiments, the thickness of the optical resonant cavity 821 can range from about 1000 angstroms to about 5000 angstroms, or greater. The physical thickness of the optical resonant cavity 821 can depend on the material(s) forming it. For example, an air cavity can be physically thicker than a cavity formed from SiON for an equivalent optical thickness because SiON has a higher refractive index than air. In some embodiments, the configured thickness of the optical resonant cavity 821 can be chosen based on the optical thickness of the cavity 821. As used herein, "optical thickness" refers to the equivalent optical path length of the cavity 821 measured in terms of the wavelength of the peak reflection from an IMOD 811. In other words, the design of cavity 821 can be usefully specified as an optical thickness (e.g., a number of wavelengths), as the actual physical spacing may vary significantly depending on both the design of the IMOD 811, and the material(s) chosen. In some embodiments, the optical thickness of the optical resonant cavity 821 can range from about one-quarter to about ten times the reflective peak wavelength of the IMOD 811. Thus, the color (or colors) reflected by the IMOD can be selected by configuring the optical resonant cavity 821 to have a certain thickness.

FIG. 25 is the prior art structure of FIG. 9A in the '241 application. As with the above discussion, the elements of FIG. 25 onto FIG. 9A may be mapped in a manner like the discussion above for FIG. 24 and FIG. 8A. Following the discussion regarding FIG. 9A in the '241 application, FIG. 9A (i.e., FIG. 25 in the present application) is a cross-sectional view illustrating another embodiment of a portion of an interferometric display 800. FIG. 9A includes an interferometric reflector 813 instead of the reflector 809 shown in FIG. 8A. The interferometric reflector 813 can be tuned to induce transmission peaks, resulting in corresponding dips in the spectrum of light reflected towards a viewer, having different spectral widths, positions, or amplitudes. Thus, the term "interferometric reflector" as used herein refers to an element that selectively transmits and reflects certain wavelengths of light on its own and can be used within an interferometric display to selectively reflect and transmit certain wavelengths of light from the display as a whole. In some embodiments, an interferometric reflector 813 can resemble a Fabry-Perot etalon or etalon reflector which can exhibit transmission peaks corresponding to the resonance of the etalon.

The interferometric reflector 813 includes a top reflective layer 815, a bottom reflective layer 819, and an optical resonant layer 817 disposed between the top reflective layer and the bottom reflective layer. Transmission peaks induced by the interferometric reflector 813 can be selected (or "tuned") by varying the thickness or index of refraction of the optical resonant layer and/or by varying the reflectance of the top and bottom reflective layers 815, 819. The reflectance of the top and bottom reflective layers 815, 819 can be affected by the thicknesses of the layers and/or by the materials chosen to form the layers.

The structure of FIG. 26 is similar to the structure discussed in FIG. 10 in the '395 application. A mapping of elements of FIG. 26 onto elements of FIG. 10 may be made as previously done for FIGS. 24 and 25. Following the discussion of FIG. 10 in the '395 application, FIG. 26 (FIG. 10) is another embodiment of a transmissive interferometric modulator 74 as illustrated in FIG. 10. The transmissive interferometric modulator 74 includes two optical stacks 75, 77 separated by a gap 82 (for example, an air gap). The fixed optical stack 75 includes a substrate layer 76A, a silver layer 80A, and an $SiO_2$ layer 78A. The movable optical stack 77 includes a substrate layer, 76B, a silver layer 80B and an $SiO_2$ layer 78B. In each optical stack the silver layer 80A, 80B borders the air gap 82 and the $SiO_2$ layer 78A, 78B is sandwiched between the silver layer 80A, 80B and the substrate 76A, 76B. In the illustrated embodiment of FIG. 10, each of the SiO$_2$ layers 78A, 78B has a thickness of 94 nm and each of the silver layers 80A, 80B has a thickness of 35 nm.

Spectral Separation

Figure 28:
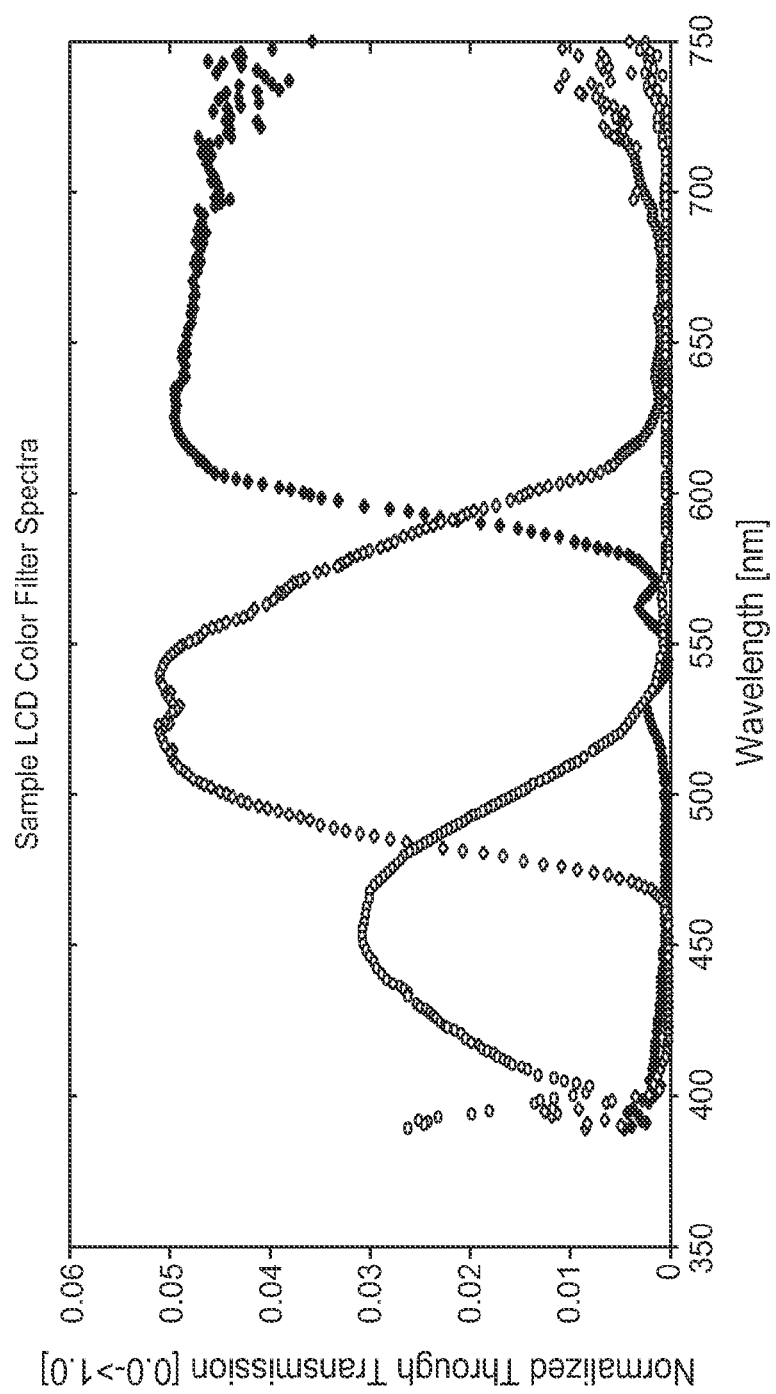
FIG. 28 depicts one example of a spectral response of a colored LCD modulator.
Figure 29:
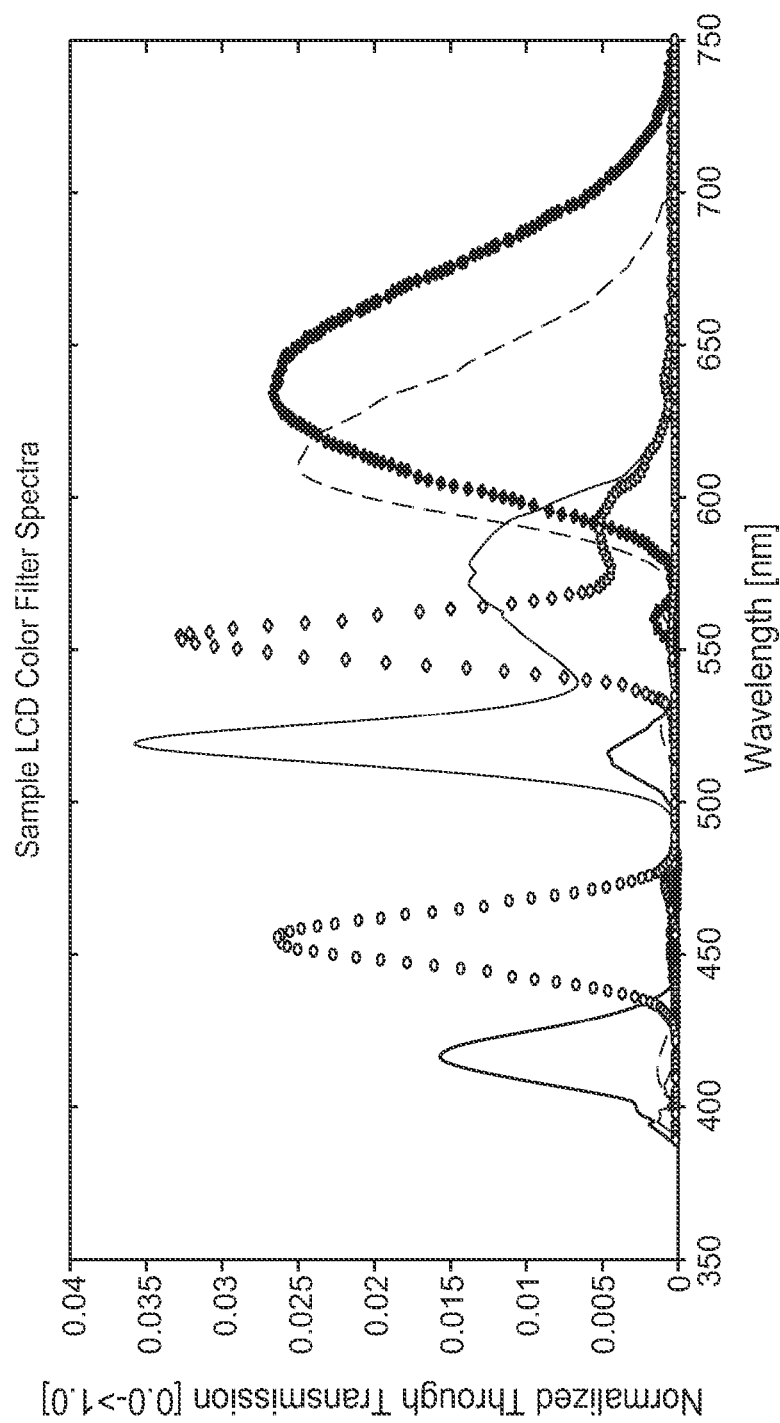
FIG. 29 depicts the resulting spectra from a MEMS/IMOD modulator through a colored LCD modulator.

Referring now to FIGS. 27A, 28 and 29, several spectra are shown that may be implemented in many of the display systems discussed herein. FIG. 27A indicates the individual spectra from IMOD1 and IMOD 2, in following a spatially multiplexed configuration like that described in FIG. 20. The lines describe the individual primary peaks from a collection of IMODs in the IMOD1 region (indicated by solid line). This spectra is seen as spectrally separated from spectrum of IMODs in the IMOD2 region (indicated by the circular dots). The dashed line in FIG. 27A is the addition of the IMOD1 and IMOD2 spectra FIG. 27B is another embodiment of a display system with a slightly different spectrum—describing the combined spectrum of IMOD1 and IMOD2 which is the result of addition of the individual IMOD spectral in each region. The IMODs could be either reflective, transflective or transmissive. In addition, IMOD1 could be a reflective IMOD while IMOD2 could be a transmissive IMOD, or vice versa—or either may be a choice of reflective, transflective or transmissive independent of each other.

Now, towards implementing many of the embodiments disclosed herein, FIG. 28 is merely one sample measured spectrum of a color LCD with the 3 spectral regions indicating the 3 different color filters. It will be appreciated that other spectra are possible depending on the color filter points and, possibly, the choice of layout (e.g. RGB stripe, PenTile, RGBW, RGBY, or any multi-primary layout known).

As a completed display system, the resulting light would tend to be a convolution of a first MEMS/IMOD modulator and a LCD modulator. FIG. 29 indicates the resultant spectrum of output of filtering the IMOD output (as indicated in FIG. 27B) using the color filters of the color LCD (as indicated in FIG. 28). As may be seen, the resulting spectra may be multi-peaked—and the peaks may be designed to be either sharply peaked or less sharp.

Field Sequential Display Systems Comprising MEMS/IMODS

As the MEMS/IMOD modulators are responsive over time that may be compatible with the Human Visual System (HVS) response time, it may be possible to combine the systems, methods and techniques discussed earlier with respect to banks of slightly different multi-primary LEDs—and apply them to any one of the embodiments of MEMS/IMOD modulator-based displays—to create a display system exhibiting field sequential (FS) processing. Indeed, a controller may be programmed to analyze input image data and apply FS processing to such display systems.

In one embodiment, a MEMS/IMOD backplane may comprise a suitable partition such that a multiple peaked spectrum is possible for the backplane. In one embodiment, such a partition may affect a multiple-peaked (e.g., 4 or higher peaks) spectra—for example, the six peak spectra as shown in FIGS. 27A and 27B. It is possible to select at least subsets of the multiple peaked spectra—and display one subset at a time exhibiting its color gamut (e.g. each subset capable of producing a white light). For example, one subset could be R1, G1 and B1 and another subset could be R2, G2 and B2. If the backplane is switched fast enough, then a FS processing is possible with the display system. In addition, such a display system may exhibit a wide color gamut—similar to the earlier discussion regarding the use of colored LEDs. As mentioned above, any subset may be chosen among reflective, transflective or transmissive—independent of the choice for other subsets.

Additional Embodiments

With all of the possible variations for MEMS/IMOD components, a few combinations are noted herein as possible embodiments:
  (1) White light backlight (e.g., CCFL, white LED, OLED, quantum dot—either edge-lit, or behind an transmissive IMOD), an IMOD (either reflecting with edge-lit, or transmissive with backlighting), LCD modulator (e.g., with chromatic or achromatic).
  (2) Colored backlight (e.g., colored LEDs, OLEDs, quantum dots—dot—either edge-lit, or behind an transmissive IMOD), an IMOD (either reflecting with edge-lit, or transmissive with backlighting), LCD modulator (e.g., with chromatic or achromatic).

With the number of physical combinations possible above, the number of display systems grows additionally with the possibility of including FS processing as an optional feature of the display system.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:
1. A display system comprising:
  a backlight source, said backlight source providing light into an optical path;
  a first modulator, receiving light from said backlight source and modulating said light on said optical path, wherein the first modulator is one of group, the group consists of: a MEMS modulator and a IMOD modulator;
  a second modulator, receiving light from said first modulator, further modulating the light from said first modulator, and transmitting said light;
  a controller, said controller inputting image data to be rendered upon said display system and sending signals to said first modulator and said second modulator.

2. The display system as recited in claim 1 wherein said second modulator comprises one of a group, said group comprising a monochrome LCD display, a colored LCD display, a MEMS modulator and a IMOD modulator.

3. The display system as recited in claim 1 wherein said first modulator comprises one of a group, said group comprising: a reflector modulator, a transmissive modulator and a transflective modulator.

4. The display system as recited in claim 3 wherein both said first modulator and said second modulator comprise monochrome LCD displays, said monochrome LCDs displays further comprising monochrome subpixels.

5. The display system as recited in claim 1 wherein said backlight source further comprises an edge-lit backlight and said first modulator further comprises one of a group, said group comprising: a reflective modulator and a transflective modulator.

6. The display system as recited in claim 5 wherein said edge-lit backlight comprises one of a group, said group comprising: white LEDs, white CCFL, white OLEDs, white quantum dot enhancement film, colored LEDs, colored OLEDs.

7. The display system as recited in claim 5 wherein said edge-lit backlight comprises one of a group, said group comprising: white LEDs, white CCFL, white OLEDs, white quantum dot array, colored LEDs, colored OLEDs.

8. The display system as recited in claim 1 wherein said backlight source further comprises an backlit backlight and said first modulator further comprises one of a group, said group comprising: a transmissive modulator and a transflective modulator.

9. The display as recited in claim 1 wherein said first modulator further comprises a partitioned backplane wherein said partitioned backplane comprising a plurality of modulators having different spectral characteristics.

10. The display as recited in claim 9 wherein said partitioned backplane comprises one of a group, said group comprising: stripes, checkerboard pattern, PenTile pattern.

11. The display as recited in claim 10 wherein said partitioned backplane further comprises n×n pixels wherein each said pixel further comprises etalon-based bichromic cells.

12. The display as recited in claim 11 wherein said bichromic cells are substantially in alignment with one of more LCD subpixels.

13. The display as recited in claim 9 wherein said plurality of modulators having different spectral characteristics further comprising at least two subsets of modulators, each said subset capable of producing a white light.

14. The display as recited in claim 13 wherein said controller is capable of sending signals to said at least two subsets of modulator to affect a field sequential display.

15. A display system comprising:
    a backlight source, said backlight source providing light into an optical path;
    a backplane, said backplane comprising a partition into at least two subsets, each subset comprising first modulators, said backplane receiving light from said backlight source and modulating said light on said optical path, wherein the first modulators are one of group, the group comprising: MEMS modulators and IMOD modulators;
    a second modulator, receiving light from said backplane, further modulating the light from said first modulators, and transmitting said light;
    a controller, said controller inputting image data to be rendered upon said display system and sending signals to said backplane and said second modulator.

16. The display as recited in claim 15 wherein each at least two subsets comprises a first subset of first modulators and a second subset of first modulators such that said first subset is capable of producing a first gamut and said second subset is capable of producing a second gamut.

17. The display as recited in claim 16 wherein said first gamut and said second gamut comprise a white point.

18. The display as recited in claim 17 wherein said display system is capable of switching between said first gamut and said second gamut to affect field sequential displays of input images.

* * * * *